(12) United States Patent
Biffi et al.

(10) Patent No.: US 12,472,479 B2
(45) Date of Patent: Nov. 18, 2025

(54) CAPSULES WITH A HYDROGEL MATRIX

(71) Applicant: Microcaps AG, Schlieren (CH)

(72) Inventors: Giulia Biffi, Zürich (CH); Konstantina Papadea, Zürich (CH); Vittoria Picece, Zürich (CH); Dmitriy Pivovarov, Zürich (CH)

(73) Assignee: Microcaps AG, Schlieren (CH)

( * ) Notice: Subject to any disclaimer, the term of this patent is extended or adjusted under 35 U.S.C. 154(b) by 161 days.

(21) Appl. No.: 18/278,036

(22) PCT Filed: Feb. 21, 2022

(86) PCT No.: PCT/EP2022/054243
§ 371 (c)(1),
(2) Date: Aug. 21, 2023

(87) PCT Pub. No.: WO2022/179983
PCT Pub. Date: Sep. 1, 2022

(65) Prior Publication Data
US 2024/0123417 A1    Apr. 18, 2024

(30) Foreign Application Priority Data
Feb. 26, 2021  (CH) .......................... 213/21

(51) Int. Cl.
*B01J 13/04*      (2006.01)
*B01J 13/20*      (2006.01)

(52) U.S. Cl.
CPC ............. *B01J 13/04* (2013.01); *B01J 13/206* (2013.01)

(58) Field of Classification Search
CPC ........ B01J 13/04; B01J 13/206; B01J 13/046; A61K 8/042; A61K 8/14; A61K 8/375;
(Continued)

(56) References Cited

U.S. PATENT DOCUMENTS

2015/0368394 A1* 12/2015 Allen ..................... C08G 63/08
                                                            252/182.14
2020/0048626 A1  2/2020 Mena et al.
2021/0085607 A1* 3/2021 Saragnese ............ A61K 9/1629

FOREIGN PATENT DOCUMENTS

CN    105641743 A  *  6/2016  ............ A61L 27/16
WO    2012099482 A2    7/2012

OTHER PUBLICATIONS

Kim et al., "Droplet Microfluidics for Producing Functional Microparticles", Langmuir, 2013, vol. 30, pp. 1473-1488.
(Continued)

*Primary Examiner* — S. Behrooz Ghorishi
(74) *Attorney, Agent, or Firm* — The Webb Law Firm

(57) ABSTRACT

Disclosed herein is a method for generating capsules with a hydrogel matrix. The method includes the steps: providing in a first chamber a dispersed aqueous phase, the dispersed aqueous phase including water and a hydrogel matrix-forming agent, in which the hydrogel matrix-forming agent is configured to form a hydrogel matrix upon exposure to a gelation inducer; providing in a second chamber a continuous oil phase, the continuous oil phase including oil and at least one first surfactant. The first and second chambers are fluidic connected by one or more channels, preferably by micro-channels. The method further includes: guiding the dispersed aqueous phase from the first chamber through the one or more channels into the second chamber to form an emulsion or dispersion of the dispersed aqueous phase in the continuous oil phase and exposing the hydrogel matrix-forming agent to a gelation inducer to form capsules with a hydrogel matrix.

17 Claims, 7 Drawing Sheets

(58) Field of Classification Search
CPC .......... A61K 8/73; A61K 8/733; A61K 8/922; A61K 9/5036; A61K 2035/128; A61K 8/11; A61Q 19/00; A23P 10/30
See application file for complete search history.

(56) References Cited

OTHER PUBLICATIONS

Vladisavljevic, "Structured microparticles with tailored properties produced by membrane emulsification", Advances in Colloid and Interface Science, 2015, vol. 225, pp. 53-87.

Zhao, "Multiphase flow microfluidics for the production of single or multiple emulsions for drug delivery", Advanced Drug Delivery Reviews, 2013, vol. 65, pp. 1420-1446.

* cited by examiner

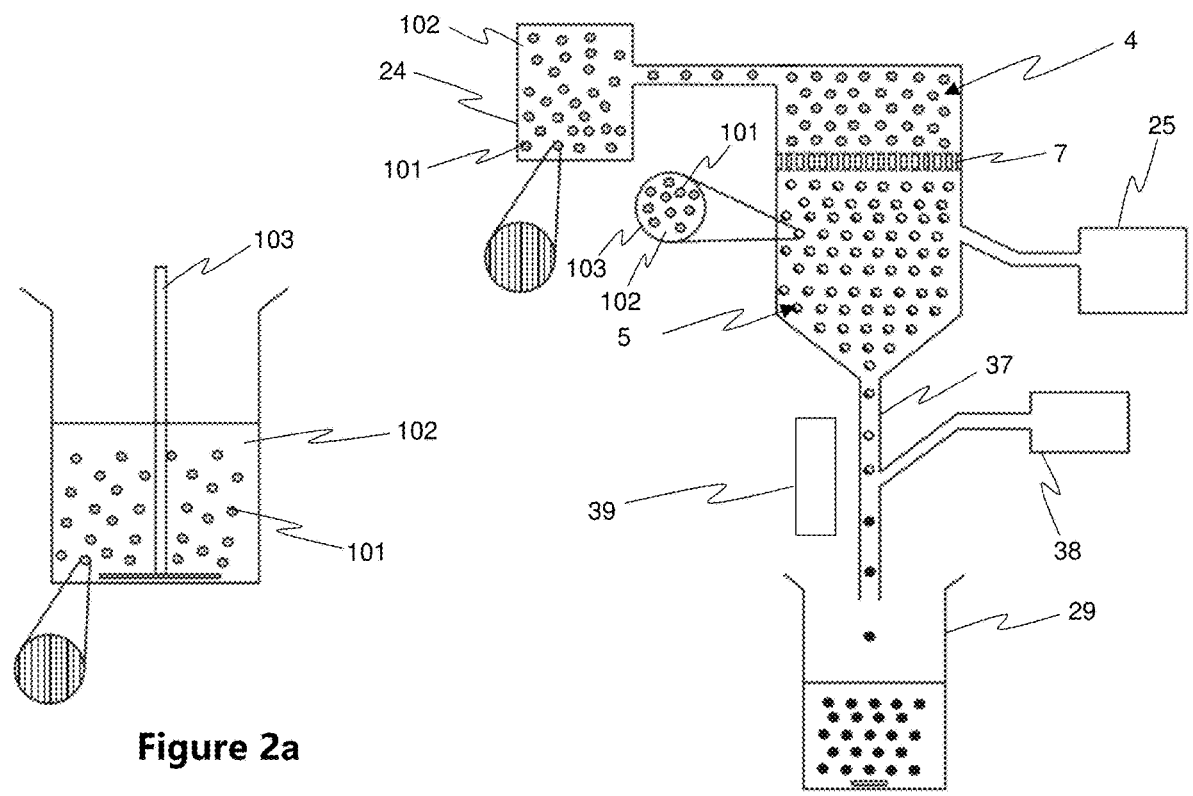
Figure 2a
Figure 2b
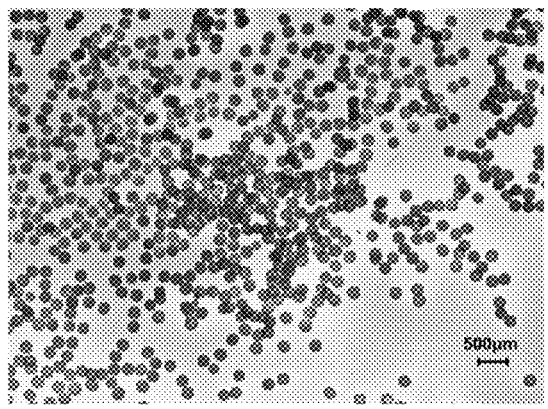
Figure 12a
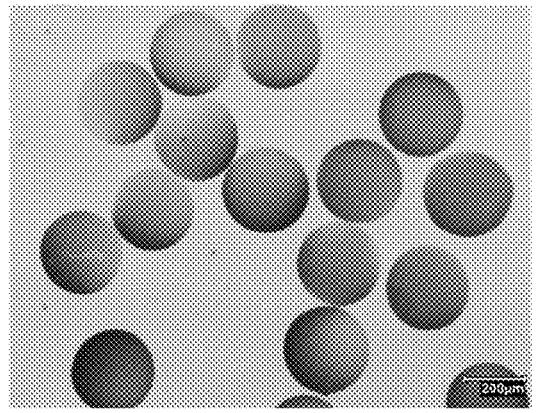
Figure 12b

CAPSULES WITH A HYDROGEL MATRIX

CROSS-REFERENCE TO RELATED APPLICATIONS

This application is the United States national phase of International Application No. PCT/EP2022/054243 filed Feb. 21, 2022, and claims priority to Swiss Patent Application No. 00213/21 filed Feb. 26, 2021, the disclosures of each of which are hereby incorporated by reference in their entireties.

BACKGROUND OF THE INVENTION

Field

The present disclosure relates to a method for generating capsules with a hydrogel matrix, particularly microcapsules, as well as a device for generating such capsules.

Description of Related Art

Capsules with particle sizes of 5.0 mm or less, particularly microcapsules with particle sizes of less than mm, preferably of between 0.05 and 0.5 mm, have found widespread application in the field of pharmaceutics, cosmetics, diagnostics, food and material science. Such capsules may be produced from an emulsion of monodisperse droplets in a continuous phase. Monodispersity increases stability, allows to accurately control volumes in multiple chemical or biological reactions and enables the production of periodic structures, reproducible processes and ensures equal reaction conditions. Microfluidics offers an exquisite platform to precisely form monodisperse droplets. The monodisperse droplets can be cured for generating microcapsules for encapsulation of active ingredients such as drugs, fragrances, flavors, peptides, living material, such as bacteria or phages etc. fertilizers, pesticides, and other active substances for well-being.

Currently, most industrial processes for generation of microcapsules employ spray drying, high speed rotation with high shearing forces, ultrasonication, mixing and/or shaking. Noteworthy, such processes generally have the disadvantage of poor control over the capsule size, size distribution as well as surface properties of the capsules. However, these parameters are crucial for many applications. Furthermore, several compounds of interests and other components can be sensitive to the typical high shear forces and/or temperatures applied in prior art processes.

SUMMARY

Hitherto known methods for producing capsules from monodisperse droplets show significant limitations. Known methods suffer from a severely limited overall operational capacity and/or from poor reproducibility and size control. However, controlling the size of the capsules is of utmost importance for various applications, particularly for applications in the pharmaceutical, fragrance and flavor industry. Furthermore, for many applications it is important to control the surface properties of the capsules, i.e. to ensure equal surface properties over each capsule and to provide even surfaces.

It is therefore a general object to advance the state of the art of generating capsules, particularly microcapsules, with a hydrogel matrix and preferably to overcome the disadvantages of the prior art fully or partially. In favorable embodiments, a method for producing such capsules is provided allowing for accurate control of the capsule size and size distribution. In further advantageous embodiments, a method for producing such capsules is provided allowing for accurate control of the surface properties of the capsules, particularly for allowing to produce capsules with equal surface properties over each capsule and/or even surfaces. In particular embodiments, capsules formed may have a maximum difference of 1% with respect to a perfect sphere. In further particular embodiments, the coefficient of variation (CV) regarding the size distribution is below 10%, preferably below 6%. In some favorable embodiments, the surface properties of the capsules vary only by a maximum of 10%, preferably by a maximum of 5%.

In a first aspect, the general object is achieved by a method for generating capsules, particularly microcapsules, with a hydrogel matrix, the method comprising the steps:
  a. Providing in a first chamber a dispersed aqueous phase, the dispersed aqueous phase comprising water and a hydrogel matrix-forming agent, wherein the hydrogel matrix-forming agent is configured to form a hydrogel matrix upon exposure to a gelation inducer;
  b. Providing in a second chamber a continuous oil phase, the continuous oil phase comprising oil and at least one first surfactant;
wherein the first chamber and the second chamber are fluidic connected by one or more channels, preferably by microchannels. Wherein the method further comprises
  c. Guiding the dispersed aqueous phase from the first chamber through the one or more channels into the second chamber to form an emulsion or a dispersion of the dispersed aqueous phase in the continuous oil phase;
  d. Exposing the hydrogel matrix-forming agent to a gelation inducer to form capsules with a hydrogel matrix.

It is understood that steps a. and b. must not necessarily be performed in this order. It may also be possible to first perform step b. and then step a. or perform them simultaneously. It is understood that, typically step d. is performed after steps a., b. and c.

It is understood that the emulsion or dispersion formed in step c. comprises a plurality of monodisperse droplets, preferably with a particle size of 5.0 mm or less, particularly microdroplets, preferably with a particle size of 1 mm or less, comprising the dispersed aqueous phase of step a. within the continuous oil phase as the continuous phase. The term "dispersed aqueous phase" in step a. does not mean that this phase in step a. cannot be monophasic, but means that it is this phase, which is to be dispersed in step c. The dispersed aqueous phase of step a. can be monophasic, but it may in some embodiments also be biphasic, i.e. be an emulsion.

One advantage of the method according to step a. is that it relates on the principles of step emulsification, i.e. the method described herein is a step emulsification method. Guiding the dispersed aqueous phase of step a. through the micro-channels enables to accurately control the size and ensure uniform size distribution of the emulsion or dispersion formed in step c. The droplets formed are stabilized by the at least one first surfactant and thus their size remains essentially constant, even after the droplets are removed from the second chamber and/or upon exposure of the hydrogel matrix-forming agent to the gelation inducer. Furthermore, the method allows a much more rapid production of capsules than the methods known in the prior art. The method disclosed herein allows for a capsule production of 100 g/h or more, or even up to 500 g/h, particularly of up to 150 kg/h or even up to 200 kg/h.

The method according to the present disclosure allows to mix all components required for hydrogel matrix formation within a single phase, i.e. within the dispersed aqueous phase. However, as hydrogel formation only occurs after the hydrogel matrix-forming agent is exposed to a gelation inducer, the advantages of step emulsification can be exploited, i.e. to first generate a emulsion or dispersion of microdroplets, whose size can be accurately controlled and only induce hydrogel matrix formation thereafter, enabling accurate control of the size and size distribution of the formed capsules.

In some embodiments, the at least one first surfactant is a nonionic surfactant, such as polyglycerol polyricinoleate (PGPR; E476), optionally in combination with polyglyceryl-3-diisostearate or with a Span® derivative, such as Span® 20 (Sorbitan laurate, CAS 1338-39-2) or Span 80 (Sorbitan oleate, CAS 1338-43-8). Further suitable surfactants are generally Span® derivatives, such as Span® 20, Span® 60 (Sorbitan stereate, CAS 1338-41-6), Span® 65 (Sorbitan tristearate, CAS 26658-19-5), Span® 85 (Sorbitan trioleate, CAS 26266-58-0), Span® 120 (Sorbitan monoisostearate, CAS 71902-01-7). PGPR has been found to be advantageous, as it stabilizes the dispersed aqueous phase sufficiently, so that the dispersed droplets, particularly the microdisperse droplets, of the dispersed aqueous phase are not immediately destroyed or coalesced, particularly upon exposure to the process flow streams and process line(s). Alternatively, anionic or cationic surfactants can be used. Other suitable surfactants may be polyglyceryl-3-polyricinoleate, sorbitan isostearate and/or polyglyceryl-3-polyricinoleate capric triglyceride. Furthermore, the first surfactant may be a solid particle, depending on the application preferably a hydrophobic hydrophilic or Janus-type particle, configured for providing a pickering emulsion. For example, the solid particle may be colloidal silica.

In some embodiments, the amount of the at least one surfactant, respectively all employed first surfactants, in the continuous oil phase is 0.25 wt % to 5 wt %, in particular 1 wt % to 4 wt %, preferably 1.5 wt % to 4 wt %. If PGPR is used in combination with a Span derivative, these are preferably employed in a PGPR:Span ratio of 1.5:1 to 15:1.

Typically, the hydrogel matrix-forming agent and optionally other components being comprised in the dispersed aqueous phase are typically completely dissolved or suspended as fine powder in the dispersed aqueous phase in order to avoid clogging of the one or more channels. In some embodiments it is possible that the hydrogel matrix-forming agent and/or other components may be suspended as fine powder. The particle size should generally be smaller than the channel diameter, particularly up to 6-times smaller. If powders are employed, the concentration of the powder may be up to 35 wt %, in particular less than 10 wt %.

In some embodiments, the capsules formed in step d. are solid capsules.

The hydrogel matrix-forming agent is configured to form a hydrogel matrix upon exposure to a gelation inducer. As outlined in certain embodiments further below, the gelation inducer may either be a suitable chemical reagent or also a change or exposure to a predetermined physical parameter, such as light or thermal energy. A suitable chemical reagent is a reagent that can react with the hydrogel matrix-forming agent under predetermined reaction conditions to produce a hydrogel matrix or catalyze hydrogel matrix formation from the hydrogel matrix-inducing agent, for example a polymerization inducer or a catalyst. The suitable chemical reagent may also be or comprise a ligand or ion, which chemically reacts with the hydrogel matrix-forming agent, for example by ligand- or ion-exchange, to form the hydrogel matrix. Change or exposure to a predetermined physical parameter may comprise irradiation with light, for example with UV, IR and/or visible light, or also a temperature increase or decrease, i.e. heating or cooling to induce formation of the hydrogel matrix from the hydrogel matrix-forming agent.

Typically, step d. may comprise solidification and/or a chemical or physical transformation of the hydrogel matrix-forming agent to the hydrogel matrix. The chemical transformation may be a ligand- or ion-exchange reaction, a polymerization or a chelation reaction. A physical transformation may for example be a solidification, i.e. gelation, in particularly a solidification induced by cooling.

As used herein, the term "microcapsule" generally refers to a capsule with a particle size of less than 4 mm, preferably between 1 μm and <4 mm, more preferably between 1 μm and <1 mm, more preferably between 3.0 μm and <1 mm. Concomitantly, a microdroplet has a droplet size, i.e. a diameter less than 4 mm, preferably between 1 μm and <4 mm, more preferably between 1 μm and <1 mm and a microchannel has a diameter of typically less than 4 mm, preferably between 1 μm and <4 mm, more preferably between 25 μm and <3.5 mm, more preferably between 25 μm and <1.3 mm.

The first chamber and second chamber are typically separated from each other with the exception of the one or more channels connecting the first chamber with the second chamber. A chamber as used herein is configured for being filled with a solution. Typically, the chambers are hermetically closed with the exception of inlets, channels and outlets. However, the chambers, in particular the second chamber, may also, at least indirectly or directly, be open to the environment.

The first chamber has typically a first fluid inlet for introducing, particularly continuously introducing, the dispersed aqueous phase in step a. into the first chamber and the second chamber has a second inlet for introducing, particularly continuously introducing, the continuous oil phase into the second chamber in step b. The second chamber also has a dispersion outlet for removing, preferably continuously removing, the emulsion or dispersion formed during step c. from the second chamber.

It is understood that the one or more channels each comprise an inlet opening into the first chamber and an outlet opening into the second chamber. Thus, the one or more channels are directly connected to the first chamber and the second chamber. Typically, the first chamber and the second chamber are fluidic connected by multiple channels, i.e. at least 10, at least 20, at least 30, at least 50 or at least 100 channels. Preferably, the first chamber and the second chamber are fluidic connected by 1 to 30 000 000, preferably 20 to 1 000 000, more preferably 100 to 1 000 000 channels. Typically, the channels are arranged essentially parallel to each other.

For example, the one or more channels may have a diameter in the range of 0.25 μm to 2000 μm, preferably 2 μm to 1200 μm, in particular of 5 μm to 1100 μm. The channels are typically micro-channels. For example, each channel may have a cross-sectional area of 0.04 $\mu m^2$ to 4 000 000 $\mu m^2$, preferably 4 $\mu m^2$ to 640 000 $\mu m^2$.

In some embodiments channel length is in the range of 0.05 mm to 20 mm, particularly between 0.1 mm to 20 mm, particularly 0.1 mm to 5 mm, particularly 0.5 to 20 mm.

In further embodiments, the aspect ratio of each channel, which is defined as channel length/minimum diameter, is 5 to 1000, particularly, 10 to 500, more particularly 10 to 50. In some embodiments, the length of the channel may be in the range of 0.05 mm to 20 mm, particularly between 0.1 mm to 20 mm, particularly 0.1 mm to 5 mm, particularly 0.5 to 20 mm.

In certain embodiments each channel comprises a channel outlet with a cross-sectional area which is larger than the cross-sectional area of the remaining part of the respective channel. In the longitudinal direction, i.e. in the direction of flow, the channel outlet has a typical length of several micrometers, for example 200 µm to 20 mm, preferably 500 µm to 5 mm. The channel outlet may for example be funnel shaped, V-shaped or U-shaped. In some embodiments, the channel outlet may have an elliptical contour. In particular, the channel outlet is not rotational symmetric, thus having a ratio of length/width of 3 and higher. Hence, the channel outlet may not have a circular or square shaped cross-section. Such a channel outlet enables the detachment of a droplet without external force. As a result, droplet formation of the dispersed aqueous phase in the continuous oil phase is decoupled and thus essentially independent from the flow rate. According to the Young-Laplace equation, the pressure at an immiscible liquid interface is higher at the channel outlets than in the second chamber. Thus a pressure gradient along the direction of the flow is generated, which causes the detachment of the fluid thread into individual droplets. Thus a pressure gradient is generated at the end of the channel, which facilitates the detachment of the fluids boundary layer and therefore the formation of the individual droplets. When reaching the channel outlet, the pressure gradient of the dispersed phase in and outside of the channel a droplet detaches without external force. Such a nozzle is advantageous, as it decouples the flow rates from the emulsification process.

Typically, each channel is defined by channel walls. The channel walls may be curved, i.e. the channel walls may be convexly or concavely shaped towards the channel outlet. Furthermore, each channel may comprise a constriction with a cross-section which is smaller than the cross-section of the rest of the channel and wherein the constriction is arranged adjacent the channel outlet. Thus, the constriction is arranged between the channel outlet and the rest of the channel.

In further embodiments, the cross-sectional area of each channel outlet is 0.12 to 36 000 000 µm$^2$, preferably 12 to 5 760 000 µm$^2$. In particular, in embodiments in which the channels are comprised in a membrane, total open area of the second side of the membrane may be 300% to 1500%, preferably 400% to 900%, larger than total open area of the channels at any other given position, such as the main section and/or the channel inlets.

In some embodiments, the one or more channels may be comprised in a membrane separating the first chamber from the second chamber. In such embodiments, the membrane can be flat, for example disc-shaped. The membrane typically has a first side facing the first chamber and a second side, being opposite to the first side and facing the second chamber. Thus, the first side of the membrane may partially limit and/or define the first chamber and the second side of the membrane may partially limit and/or define the second chamber. The one or more channels, typically multiple channels, extend from the first side to the second side through the membrane. Each channel comprises a channel inlet arranged at the first side, a channel outlet arranged at the second side and a main section being arranged between the channel inlet and channel outlet, wherein the channel outlet comprises a shape deviating from the shape of the main section.

In some embodiments the membrane thickness is in the range of 0.05 mm to 25 mm, particularly between 0.1 mm to 25 mm, particularly 0.5 to 25 mm particularly 0.1 mm to 5 mm. Typically, the thickness of the membrane may be equal to the total length of each channel.

The membrane may typically be a monolayer membrane. That is, the membrane is made from a single piece. Preferably, such a membrane is made from a massive material and does not contain any phase interfaces or transition areas in addition to the multiple channels of the membrane. Such a membrane is advantageous for the quality of the generated droplets, as any phase interfaces and transitions are detrimental to droplet formation and droplet stability.

In some embodiments, the membrane may be exchangeable. The multiple channels of the membrane are typically micro-channels. For example, each channel may have a cross-sectional area of 0.04 µm$^2$ to 4 000 000 µm$^2$, preferably 4 µm$^2$ to 640 000 µm$^2$.

In further embodiments, the channel outlet may be wedge-shaped. In particular, the channel outlet may comprise an elliptical cross-section with respect to a transversal plane being perpendicular to the extending channel, i.e. the channel outlet may be larger in a first direction than in a second direction.

In further embodiments, the second side of the membrane comprises a total open area that is larger than the total open area of the first side. Such a membrane has the advantage that high quality droplets are generated, even at flow rates of up to 5 l/h. In some embodiments, the flow rate per channel may be between 1 µl/h to 50 ml/h, preferably 10 µL/h to 5 ml/h.

In certain embodiments, each channel outlet may have an elliptical contour. Thus, the channel outlet may have an elliptical cross-section with respect to a plane being transversal to the extending channel and being parallel to the first or second side of the membrane. Channel outlets with an elliptical contour have a beneficial effect on the quality of the formed droplets, as any edges within the channel may lead to unstable and in homogeneous droplets.

In some embodiments, the membrane is disk-shaped. Such a membrane may have a circular contour. Alternatively, the membrane may have an angular, particularly a triangular or rectangular, contour.

In further embodiments, the membrane comprises 0.06 to 600 000 channels/cm$^2$, preferably 20 to 30 000 channels/cm$^2$.

In some embodiments, the membrane is made of glass or a polymeric material, such as polymethyl(meth)acrylate, polyolefin, such as polypropylene or polyethylene, or PTFE or of a metallic material, such as steel.

In some embodiments, the membrane material comprises a hydrophobic surface and/or coating, thereby preventing that the dispersed aqueous phase has an affinity to the membrane. In particular embodiments, the membrane is configured such that the contact angle between the continuous phase, the dispersed phase, and the membrane material is higher than 120°.

In some embodiments, the dispersed aqueous phase in step a. additionally comprises at least one first compound of interest. The first compound of interest may be selected from a protein, small molecule, particularly a fragrant or flavor, cosmetic ingredient, active pharmaceutical ingredient such as cannabinoids, hemp extracts, caffeine, melatonin or hyaluronic acid; antibody, peptide, enzyme, RNA, DNA, vitamin and micro-organisms, including bacteria, phages, algae, cells, fungi, and bacteria supporting components, such as sugars, buffers, nutrients, reduction and oxidizing agents, etc. The at least one first compound of interest may for example be mixed into the aqueous phase in a suitable concentration.

In particular embodiments, the at least one first compound of interest being comprised in the dispersed aqueous phase of step a. is hydrophilic. Typically, the at least one first compound of interest is water soluble at ambient temperature (20-25° C.).

In some embodiments, step a. comprises dissolving the hydrogel matrix-forming agent in water to form a solution. Particularly, dissolving may be performed under stirring, homogenization and/or heating the solution to between 40° C. to 100° C. The at least one first compound of interest may already be mixed or dissolved in the water, it may be added after the solution of the hydrogel matrix-forming agent in water has been prepared or it may be added during dissolving the solution of the hydrogel matrix-forming agent in water.

In specific embodiments, the at least one compound of interest is a living organism, in particular a microorganism, such as bacteria, a virus, including a phage, or a single cell. In some embodiments, the living organism may be provided in a dormant state into the aqueous dispersed phase. It is understood that the dormant state of a living organism relates to an inactive state.

The method according to the present disclosure is particular suitable for encapsulating living organisms, because the method exerts only marginal shear forces as compared to the method of the prior art. Furthermore, the encapsulation efficiency is significantly higher than of methods known in the prior art. It is possible to reach encapsulation efficiencies of up to go % or even up to 95% with respect to the living organism.

In some embodiments, the method is performed at room temperature, which is highly beneficial for encapsulating living organisms, as the viability is increased.

Furthermore, by guiding the dispersed aqueous phase through the one or more channels, the channel dimension, in particular the channel diameter, dictates the amounts of living organism per droplet and thus the mount of organism per capsule formed. Therefore, by choosing predefined channel dimensions, accurate control of organism loading per capsule is possible.

In some embodiments, the channel diameter is chosen such that it is at least 6 times larger than the size of the living organism, or also any other solid particle.

In some embodiments in which the at least one compound of interest is a living organism, the living organism, such as cells or bacteria is provided by cultivation prior to being added into the dispersed aqueous phase. For example, cultivation may be performed on a suitable nutrient medium, such as agar-agar. In certain embodiments, viability of the living organism is monitored during cultivation and the living organism freeze dried when the viability reaches its maximum and subsequently added to the dispersed aqueous phase.

In certain embodiments it is beneficial to deoxygenate the water of the aqueous dispersed phase and/or the continuous oil phase. Deoxygenating can be achieved by common laboratory techniques, such as degassing with inert gases, such as argon or nitrogen, or by the freeze-pump-thaw technique. Such deoxygenating is beneficial, because the living organism can be maintained in its dormant state.

In some embodiments, the dispersed aqueous phase additionally comprises nutritional components for the living microorganism, such as sugars, electrolyte solutions, and the like.

In certain embodiments, the dispersed aqueous phase additionally comprises buffer solutions configured to maintain a pH suitable for the corresponding living organism.

In some embodiments, the dispersed aqueous phase in step a. has a pH of 6.5 or higher, particularly between 6.5 and 12, particularly between 7 and 10, i.e. between 7 and 8.5. The pH may be adjusted by the addition of one or more bases, such as NaOH, KOH and the like and/or acids, such as HCl, and/or by the use of common buffer systems.

In some embodiments, the dispersed aqueous phase in step a. contains at least one additional solvent which is miscible with water, such as EtOH, MeOH, DMF, DMSO, and/or the like.

In some embodiments, the dispersed aqueous phase in step a. is an emulsion of an oil composition in a water phase, wherein the emulsion comprises at least one second surfactant. It is understood that the oil composition comprises oil.

In such embodiments, the dispersed aqueous phase which is to be guided into the second chamber is already an emulsion. Thus, by guiding it through the one or more channels, particularly microchannels, an oil in water in oil emulsion or dispersion is formed. Amongst others, this has the advantage that not only hydrophilic compounds of interest can be dissolved and thus evenly distributed in the dispersed aqueous phase, but also hydrophobic compounds of interest.

In certain embodiments, the oil composition therefore comprises at least one second compound of interest. The at least one second compound of interest may typically be dissolvable in oil, i.e. it may be a hydrophobic compound. The second compound of interested may be selected from a protein, small molecule particularly a fragrant or flavor, cosmetic ingredients, active pharmaceutical ingredient such as cannabinoids, hemp extracts, caffeine, melatonin or hyaluronic acid; antibody, peptide, enzyme, RNA, DNA, vitamin and micro-organisms.

It is understood that in embodiments in which the dispersed aqueous phase in step a. is an emulsion of an oil composition in a water phase, the dispersed aqueous phase in step a. comprises not only water, but also oil. However, the majority of the dispersed aqueous phase is composed of the water phase. Typically, more than 60 wt %, particularly more than 70 wt %, particularly more than 80 wt %, particularly more than 90 wt %, particularly more than 95 wt %, particularly more than 99 wt % of the dispersed aqueous phase constitutes the water phase.

In some embodiments, the amount of oil in the dispersed aqueous phase in step a. is between 0 wt % to 40 wt %, particularly between 3 wt % to 40 wt %.

The emulsion of the oil composition in the water phase is typically a stable emulsion. Thus, it may be stable for 60 min to 1 month, particularly 60 min to 24 h, particularly 60 min to 600 min, preferably from 100 min to 500 min. Such a stability ensures that the droplets are not directly destroyed, particularly during step c. and/or d.

In some embodiments the emulsion of the oil composition in the water phase is prepared by shear mixing, particularly at 8000 to 20000 rpm, in particular 8000 to 16000 rpm, in particular at 8000 to 13000 rpm. Additionally, or alternatively, sonication, for example, tip sonication, may be used. Mixing may be performed for 7 to 8 min. Furthermore, it may in some embodiments be advantageous to provide heating for preparing the emulsion, particularly at temperatures between 30 to 100° C. However, it may also be possible to generate the emulsion at ambient temperature.

In some embodiments, the oil of the oil composition may be selected from one or more of medium-chain triglyceride (MCT), menthol, vegetable oils, such as sunflower, canola, corn, peanut, soybean oil, etc., oleates such as ethyloleate, hydrocarbons, particularly alkanes, such as hexane, heptane, octane, nonane, decane, etc., and the like.

In some embodiments, the amount of the at least one second surfactant in the dispersed aqueous phase in step a. is between 0.1 wt % to 3 wt %, in particular between 0.2 Wt % to 3 wt %, particularly between 0.5 wt % to 2 wt %.

In some embodiments, the at least one second surfactant is a nonionic surfactant, such as polyvinylacohol (PVA). Other suitable second surfactants may be starch, sodium 0.5-2 octenyl succinate, Tween derivatives, such as Tween 20, or Span derivatives, such as Span 80 or Span 85. Alternatively, anionic or cationic surfactants can be used. Other suitable surfactants may be polyglyceryl-3-Polyricinoleate, sorbitan isostearate and/or polyglyceryl-3-polyricinoleate capric triglyceride. Furthermore, the second surfactant may be a solid particle, depending on the application preferably a hydrophobic hydrophilic or Janus-type particle, configured for providing a pickering emulsion. For example, the solid particle may be colloidal silica.

In some general embodiments, the dispersed aqueous phase of step a. further comprises a masked gelation-inducer agent. The masked gelation-inducer agent and typically also the hydrogel matrix-forming agent are configured such that they do essentially not react, or not react at all, as such with each other to form a hydrogel matrix. Thus, because the gelation-inducer agent is masked, it can be mixed with the hydrogel matrix-forming agent without reacting with it, i.e. without the occurrence of hydrogel matrix-formation. This is advantageous, because the masked gelation-inducer agent and the hydrogel matrix-forming agent are both present in the dispersed aqueous phase of step a., i.e. before the dispersed aqueous phase is guided through the at least one channel and thus channel clogging is prevented. It is however desired that the initiation of matrix formation can be predetermined, i.e. can be specifically induced at a certain stage. In such embodiments, step d. comprises the liberation of the gelation inducer from the masked gelation-inducer agent. As outlined below, liberation may be ligand- or ion-exchange or a decomposition of a chemical reagent, such as a metal complex or an organic molecule. The liberation is considered as an unmasking reaction in order to generate the gelation-inducer agent. In general, it is understood that in contrast to the masked gelation-inducer agent, the gelation-inducer agent, i.e. the unmasked variant is configured to react with the hydrogel matrix-forming agent to form a hydrogel matrix.

The masked gelation-inducer agent can in some embodiments be present in the dispersed aqueous phase in a concentration of 2 mM to 120 mM, preferably between 3 mM to 60 mM. It is noted that the higher the concentration, the greater is the hardness of the capsules obtained.

Hydrogels can be generated by a multitude of different pathways. For example, a monomer can be used as hydrogel matrix-forming agent and a polymerization inducer can be used as gelation-inducer agent. Typical polymerization inducers can be radicals, generated from the decomposition of organic molecules, such as AIBN, ammonium persulfate, 2-hydroxy-2-methylpropiophenone (HMPP), Darocur® 1173 (2-Hydroxy-2-methyl-1-phenyl-propan-1-one, CAS 7473-98-5), phenyl-bis-(2,4,6-trimethylbenzoyl)-phosphinoxid (BAPO), diphenyl-(2,4,6-trimethylbenzoyl)-phosphinoxid (TPO), butyl peroxide, or dibenzoylperoxide. For example, N-isopropylacrylamide can be employed as a monomer, optionally together with a suitable crosslinker, such as bisacrylamide. A suitable initiator in this case may be ammonium persulfate. In another example, pentaerythritol tetrakis(3-mercaptopropionate) and PEG-DA can be used as monomers and hydroxycyclohexyl phenyl ketone as initiator.

Alternatively, water soluble polymers can be used as hydrogel matrix-forming agent, for example sodium alginate. In this case, the hydrogel is formed by ion-exchange, for example by exchanging $Na^+$ with $Ca^{2+}$, $Mg^{2+}$, $Sr^{2+}$ o $K^+$. In this case, the masked gelation-inducer agent is a masked form of these ions, for example the corresponding EDTA complexes, such as Ca—$Na_2$-EDTA, Mg—$Na_2$-EDTA, Sr—$Na_2$-EDTA, etc. Alternatively, the carbonates may be used, such as $CaCO_3$, $MgCO_3$, $SrCO_3$, etc. Alternatively, the gelation-inducer agent may also be a polyammonium salts, i.e. a polymer comprising a plurality of polyammonium groups.

In particular embodiments, the masked gelation inducer agent contains an alkali metal ion or an alkaline earth metal ion, such as $Ca^{2+}$, $Mg^{2+}$, $Sr^{2+}$ or $K^+$. As mentioned above, the masked gelation inducer agent can thus be an EDTA complex, such as Ca—$Na_2$-EDTA, Mg—$Na_2$-EDTA, Sr—$Na_2$-EDTA and the like, or it may be a corresponding carbonate, such as $CaCO_3$, $MgCO_3$, $SrCO_3$, etc. In these embodiments, liberation of the gelation-inducer agent can readily be achieved by the acidification, i.e. by acid addition, or by heat.

In some embodiments, liberation of the gelation inducer from the masked gelation-inducer agent comprises reacting the masked gelation-inducer agent with a suitable chemical reagent, such as a Brønsted acid, preferably a carboxylic acid or a mineral acid, to form the gelation inducer. Suitable acids may for example be acetic acid or citric acid. Acetic acid has the advantage that compared to some other acids, acetic acid is better soluble in oil and capsules with greater hardness are obtained. If an acid is used, the amount of acid may typically be 0.5 wt % to 10 wt % of the emulsion or dispersion generated in step c. Alternatively, liberation may also be achieved by thermal decomposition of the masked gelation-inducer agent, or by irradiating the masked gelation-inducer agent with light of a suitable wavelength, for example with UV, VIS or IR light.

In some embodiments, the masked gelation-inducing agent is a chelate of an inorganic salt, particularly an alkaline earth metal salt or an alkaline metal salt. The chelate may for example be a chelate of a carboxylic acid. Instead of adding an acid as such, a photoacid generator, i.e. a compound being configured to produce an acid upon irradiation, preferably UV irradiation, such as diphenlyiodonium nitrate can either already be present in the dispersed aqueous phase of step a., in the continuous oil phase of step c. or added before step d. Upon irradiation with UV light, which may be performed in step d., the photoacid generator generates an acid, which then liberates the chelated alkaline earth metal ions, which in turn react with the matrix-forming agent, for example with sodium alginate to form the hydrogel matrix.

In certain embodiments, the emulsion or dispersion formed in step c. is first removed, preferably continuously removed, from the second chamber, typically via the dispersion outlet, before the suitable chemical reagent for liberation of the gelation inducer is added. This has the advantage that the risk of channel clogging and is avoided.

In some embodiments, the gelation inducer is light, particularly visible or UV light or thermal energy. In embodiments, in which the gelation-inducer is light, the hydrogel matrix-forming agent may form the hydrogel for example upon irradiation with light of a suitable wavelength. In specific examples, polymerization may be induced upon irradiation. In embodiments in which the gelation inducer is thermal energy, respectively a change of temperature, step d. may for example comprise cooling. In this case, the matrix-forming agent may for example be agar, particularly agarose, having a lower gelling temperature, in particular as compared to other polysaccharides. Typically, steps a., b. and/or c. may be performed at higher temperatures than step d., typically at temperatures above the gelling temperature of the corresponding matrix-forming agent, in order to prevent gelling during these steps. For example, steps a., b. and/or c. may be performed at above 30 to 35° C., preferably between 30° C. to 100° C., in particular between 40° C. and 80° C.

In some embodiments, the emulsion or dispersion formed in step c. is removed, preferably continuously removed, from the second chamber. This allows a high throughput, as new droplets can continuously form during step c. within the second chamber, while the formed emulsion or dispersion is continuously removed, preferably via the dispersion outlet.

In some embodiments, step d. is at least partially, i.e. for a predetermined time, or also fully, performed under continuous flow of the emulsion or dispersion formed in step c. Performing step d. under continuous flow means that the droplets and/or forming and/or formed capsules are kept in motion. For example, performing step d. at least partially under continuous flow may be achieved by flow of the emulsion or dispersion formed in a process line during step d. such as a tube, a column, a pipe or the like. Alternatively, capsules can be kept in motion in a pipe using a passive mixer, such as a micro-mixer, pulse mixers, serpentine mixers, etc. Particularly, the emulsion or dispersion formed may be guided vertically, i.e. in direction of the gravitational force vector. This provides free-falling of the emulsion or dispersion formed in step c. during step d. Alternatively, performing step d. under continuous flow may comprise mild stirring, i.e. stirring at 50 rpm to 250 rpm, particularly between 50 rpm to 70 rpm. Performing step d. under continuous flow avoids that the droplets and/or forming and/or formed capsules sediment, aggregate, and/or contact each other before their shape has is stable enough, i.e. before hydrogel matrix formation is sufficiently advanced to ensure structural integrity of each capsule. Thus, such embodiments ultimately ensure equal capsule size distribution and also even surfaces of each capsule.

In some embodiments step d. is performed under continuous flow for 10 s to 10 min, particularly for 10 s to 5 min. Thereafter, it is in some embodiments possible to further perform step d., i.e. to complete hydrogel formation in a separate collection vessel under steady conditions or under stirring.

In specific embodiments, the process line, such as the tube, pipe or column, is directly connected to the dispersion outlet of the second chamber.

In some embodiments, the dispersion outlet of the second chamber is arranged such that the emulsion or dispersion formed in step c. flows in the direction of the gravitational force vector upon being removed from the second chamber via the dispersion outlet. This is beneficial, because free falling of the emulsion or dispersion ensures structural integrity of each capsule.

Furthermore, in some embodiments, any edges or changes of direction of the process line are essentially avoided between the dispersion outlet in direction of flow for about 1 cm to 35 cm, particularly between 1 cm to 20 cm, particularly between 1 cm t 10 cm. This ensures that the hydrogel matrix formation is sufficiently advanced to ensure structural integrity of the capsules, before they aggregate or sediment.

In embodiments in which liberation of the gelation inducer from the masked gelation-inducer agent comprises reacting the masked gelation-inducer agent with a suitable chemical reagent as described above, the suitable chemical reagent may be added directly to the process line, which may optionally be directly connected to the dispersion outlet of the second chamber. This may for example be achieved by an inlet line being in fluidic connection at one end with a reservoir containing the suitable chemical reagent and at the other end with the process line containing the emulsion or dispersion formed in step c. In certain embodiments, the connection of the inlet line for the suitable chemical reagent and the process line is arranged in a distance of at least 3 cm, preferably between 3 cm to 50 cm, particularly between 3 cm and 10 cm, to the channel outlet and/or to the dispersion outlet of the second chamber. This ensures that the hydrogel matrix formation does not occur in the second chamber or even in proximity of or within the at least one channel, thereby avoiding channel clogging and precipitation and solid residues at or in the second chamber.

In some embodiments, the matrix-forming agent is a polysaccharide or suitable salt thereof. A suitable salt is a salt form which can be completely dissolved in water. In some embodiments, polysaccharide salts are composed of an anionic polysaccharide component and a suitable counter cation. Suitable polysaccharides are selected from chitosan, cellulose, alginate, particularly sodium alginate, carrageenan, agar, agarose, pectins, gellan, starch, poly galacturonic acid, and the like. Preferred polysaccharides are alginate, preferably sodium alginate, chitosan, carrageenan and cellulose, more preferably alginate, preferably sodium alginate, chitosan. In some embodiments, the polysaccharides may be solubilized by adjusting the pH, for example by basifying the pH of the dispersed aqueous phase.

Alternatively, the hydrogel matrix-forming agent may be a polycarboxylate. In this case, the masked gelation inducer agent contains an alkaline earth metal ion or an alkaline earth metal ion, such as $Ca^{2+}$, $Mg^{2+}$, $Sr^{2+}$ or $K^+$ as describe above which can form a water insoluble matrix upon ion exchange with the polycarboxylate. Alternatively, the masked gelation inducer agent may be a masked polyammonium salt, i.e. the gelation-inducer agent may be a polyammonium salt, i.e. a polymer comprising a plurality of polyammonium groups.

As an alternative, the hydrogel matrix-forming agent may a monomer which is configured to undergo a polymerization reaction upon exposure to a suitable gelation inducer, such as light, thermal energy or a gelation inducer agent, such as a radical or an ion.

In some embodiments, the amount of hydrogel matrix-forming agent in the dispersed aqueous phase is between 0.1 wt % to 2 wt %, particularly between 0.25 wt % and 1.5 wt %. The higher the amount of hydrogel matrix-forming agent and/or its molecular weight, the higher the hardness of the resulting capsule.

In embodiments in which the hydrogel matrix-forming agent is a polysaccharide or suitable salt thereof and in which the dispersed aqueous phase of step a. further comprises a masked gelation-inducer agent, such as for example Ca—$Na_2$-EDTA, Mg—$Na_2$-EDTA, Sr—$Na_2$-EDTA, or a carbonate as described above, the ratio between the polysaccharide or suitable salt thereof and the masked gelation-inducer agent in the dispersed aqueous phase may be in the range of 1.4:1 to 0.4:1.

In further embodiments, a pressure of 1.01 bar to 2.0 bar, in particular 1.01 bar to 1.15 bar, preferably of 1.03 bar to 1.07 bar is applied to the first chamber, particularly during step c., and/or a pressure of 1.02 bar to 1.2 bar, preferably of 1.05 bar to 1.1 bar is applied to the second chamber particularly during step C. It is understood that these pressure values relate to absolute pressures, i.e. a pressure of 1.01 bar is a pressure which constitutes an overpressure of 0.01 bar with respect to the atmospheric pressure.

In some embodiments, the flow rate is 7 g/h to 3000 g/h, in particular from 7 g/h to 100 g/h.

In some embodiments, the method is performed in an open system device, i.e. a device which is not closed with respect to the environment. Such embodiments simplify accurate pressure control as uncontrolled flowrates can be avoided.

In some embodiments, the pressure applied to the first chamber is smaller than the pressure applied to the second chamber. It is understood that the first pressure can be adjusted by the pressure with which the dispersed aqueous phase is provided via the first fluid inlet of the first chamber to the first chamber and/or the second pressure can be adjusted by the pressure with which the continuous oil phase of step b. is provided via the second fluid inlet of the second chamber to the second chamber.

In some embodiments, step d. is performed in total for 1 min to 30 min, particularly from 1 min to 10 min. Thus after this time, hydrogel matrix formation is complete.

In some embodiments, a structural stabilizer may be added to or being present in the dispersed aqueous phase. A structural stabilizer are compounds configured for enhancing the structural stability of the shell. Examples include gum arabicum, agar, in particular agarose, as well as xanthan gum or cellulose and derivatives, for example methylcellulose or nanocrystalline or microcrystalline cellulose, and the like.

In some embodiments other additives may be added to or being present in the dispersed aqueous phase, such as glycerol, buffer, plant based proteins such as pea protein, pea legumin, maltodextrin, starch, preservatives and the like.

In some embodiments, the capsules are coated with an additional layer or with two or more additional layers, in particular by dip coating, after step d. In some embodiments, dip coating may be repeated with different agents to form different additional layers.

In some embodiments, the formed capsules are isolated, dried, cured and/or preserved after step d. Isolation of the capsules can for example comprise filtering or sieving in order to separate the capsules from residual oil of the continuous oil phase, and optionally washing of the capsules with water optionally including a tenside, such as sodium laurylsulfate (SDS), a Tween derivative, such as Tween® 20 (Polyoxyethylene (20) sorbitan monolaurate, CAS 9005-64-5) or 80 (Polyoxyethylene (20) sorbitan monooleate, CAS 9005-64-6), or PVA. Curing may for example comprise drying of the capsules, for example by an air stream or by freeze drying, in order to evaporate all or at least the majority of the unbound water. Curing may also comprise further stirring of the capsules in an aqueous inorganic salt solution, such as a $CaCl_2$) or $MgCl_2$ solution, preferably a 1-10, more preferably 1 to 5 wt % aqueous solution of the inorganic salt. This further increases the stability and structural integrity of the capsules. Preserving may be achieved by immersing the capsules in distilled water or in an aqueous inorganic salt solution, such as a $CaCl_2$) or $MgCl_2$ solution, preferably a 1 to 10, more preferably 1 to 5 wt % aqueous solution of the inorganic salt. Such preserving has been found to increase bench stability of the capsules. In some embodiments, curing can comprise softening of the formed capsules. This may be achieved immersing the capsules in suitable aqueous inorganic salt solutions, such as sodium citrate alone or in combination with NaCl. Citrate for example may bind calcium and thus partially remove calcium from the network. Preferably a concentration below 10 wt %, more preferably below 5 wt % aqueous solution of the inorganic salt is used. The washing step may be particularly used for removing unwanted ingredients and or derivatives thereof. For example, EDTA ligand can be removed by washing and/or residual oil can be removed.

In some embodiments, at least step c. is performed in a device for producing capsules with a hydrogel matrix, the device comprising a first inlet for supplying dispersed aqueous phase, the dispersed aqueous phase comprising water and a hydrogel matrix-forming agent, the first inlet opening into a first chamber; a second inlet for supplying a continuous oil phase, the continuous oil phase comprising oil and at least one first surfactant, the second inlet opening into a second chamber; a dispersion outlet for collecting the emulsion or dispersion or microdroplets from the second chamber. Furthermore, the device comprises a membrane, particularly a membrane as described above, which separates the first chamber and the second chamber and which comprises a first side facing the first chamber and a second side facing the second chamber. The membrane comprises multiple channels extending from the first side to the second side, i.e. providing a fluidic connection of the first chamber and the second chamber. Each channel comprises a channel inlet arranged on the first side and a channel outlet arranged on the second side. The first chamber may typically be configured such that a flow rate of the dispersed aqueous phase through all of the individual channels is essentially equal. In the state of the art, an inhomogeneous pressure distribution, in particular of the dispersed aqueous phase, enables only a small percentage of the channels to actively produce droplets. An equal pressure distribution over the first side however, allows for a steady flow of the dispersed aqueous phase into continuous oil phase and for the generation of droplets with a reproducible quality with a high throughput of up to 5 liter per hour, or even up to 100 liter per hour.

In certain embodiments, the second chamber may be made from glass or a transparent polymer, such as PTFE, polymethyl(meth)acrylate or polyoxymethylene, or from metals such as steel, aluminum or titanium. In general, the device may comprise a container, such as a glass container, which partially forms the second chamber. Together with the membrane, the container may form the second chamber. In some embodiments, the first chamber may be made from metal, for example aluminum or steel or from a transparent polymer, such as PTFE, polymethyl(meth)acrylate or polyoxymethylene.

The dispersion outlet may for example be in fluidic communication with the process line as described above. The process line may be a tube, a column, a pipe or the like. Preferably, the process line may at least partially be straight, i.e. non-curved. The straight part is typically directly connected to the dispersion outlet.

In some embodiments, the device comprises a reservoir for a suitable chemical reagent being configured to liberate the masked gelation-inducer agent. The reservoir is in fluidic communication with the process line via an inlet line.

In certain embodiments, the connection of the inlet line for the suitable chemical reagent and the process line is arranged in a distance of at least 3 cm, preferably between 3 cm to 50 cm, particularly between 3 cm and 10 cm. This ensures that the hydrogel matrix formation does not occur in the second chamber or even in proximity of or within the at least one channel, thereby avoiding channel clogging and precipitation and solid residues at or in the second chamber.

In some embodiments, the process line is further in fluidic communication with a collection vessel for collecting the formed capsules.

In some embodiments, the dispersion outlet of the second chamber or the second chamber itself is arranged such that the emulsion or dispersion formed in step c. flows in the direction of the gravitational force vector upon being removed from the second chamber via the dispersion outlet. This is beneficial, because the free falling emulsion or dispersion to ensure structural integrity of each capsule.

Furthermore in some embodiments, any edges or changes of direction of the process line are essentially avoided between the dispersion outlet in direction of flow for about 1 cm to 30 cm, particularly between 1 cm to 10 cm. This ensures that the hydrogel matrix formation is sufficiently advanced to ensure structural integrity of the capsules, before they aggregate or sediment.

In some embodiments, the first chamber is configured such that in an operative state, the pressure along the first side of the membrane is essentially isobaric. For example, the first inlet may comprise a nozzle for providing an isobaric pressure distribution over the first side of the membrane. In particular, a spray nozzle may be used. Alternatively, the first chamber may be shaped such that an isobaric pressure distribution over the first side of the membrane is provided.

In further embodiments, the first chamber has a rounded cross-section with respect to a cross-sectional plane, which is perpendicular to the membrane and rotationally symmetric with respect to a central longitudinal axis. The term "rounded cross-section" as used herein refers to a continuous curve without increments, particularly to a curve which has in the cross-sectional plane being perpendicular to the membrane, a radius of at least 1 mm, particularly at least 5 mm, particularly at least 10 mm. It is understood that the curvature in the cross-sectional view can be described as a part of a circle with said radius. Thus, the sidewalls of the first chamber may continuously converge towards each other in the upstream direction. The central longitudinal axis is an axis extending in the longitudinal direction of the device, which is arranged in the center of the device and/or to an axis being perpendicular to the membrane and intersecting the center of the membrane. For example, the first chamber may have a U-shaped cross-section or may be concavely rounded or semi-circular. The rounded cross-section is typically edgeless and thus excludes edges, which would lead to an uneven pressure distribution when the dispersed aqueous phase is forced through the membrane. Preferably, the first chamber may have the shape of a spherical dome. The shape of the first chamber may in general preferably be essentially rotationally symmetric to the central longitudinal axis.

In certain embodiments, the dispersion outlet may essentially be arranged on the central longitudinal axis and/or the axis being perpendicular to the membrane and intersecting the center of the membrane. Preferably, the second chamber is tapered towards the dispersion outlet. For example, at least parts of the second chamber may be arch- or cone-shaped towards the dispersion outlet. These embodiments ensure that no droplets are entrapped and all are directly collectable via the dispersion outlet.

In some embodiments, the first chamber has the shape of a hemisphere or of a truncated cone. Typically, the hemisphere or the truncated cone opens towards the membrane, that is, the largest radius is typically closest to the membrane. The term "hemispherical" as used herein also comprises other spherical segments, such as a third of a sphere. Thus, in some embodiments the shape of the first chamber is a spherical dome or spherical cap. Preferably, if the first chamber has a shape of a spherical dome, and/or particularly a hemispherical shape, the first inlet may be arranged adjacent to or in the region of a pole of the spherical dome of the first chamber, particularly of the hemispherical shaped first chamber. Such shapes have the advantage that the material flow of the dispersed aqueous phase is equally distributed over the first side of the membrane, thereby helping to provide an equal pressure distribution adjacent to individual channel. The first inlet may for example be arranged essentially perpendicular to the central longitudinal axis, i.e. essentially parallel to the first side of the membrane, or also parallel to the central longitudinal axis, i.e. perpendicular with respect to the first side of the membrane.

In some embodiments, the first inlet is arranged in an angle of essentially 90° or less with respect to the channels of the membrane. Typically, all channels are arranged essentially in parallel to each other. This has the beneficial effect that the dispersed aqueous phase is not directly forced onto the membrane, thereby further enabling to provide a uniform pressure distribution over each channel of the membrane. For example, the angle between the first inlet and the channels of the membrane may be between 60° and 90°, particularly 75° and 90°. Preferably, the first inlet is essentially transversely, preferably perpendicularly, arranged to the multiple channels of the membrane. Thus, in such embodiments, the first inlet may be parallel to the first side of the membrane.

In further embodiments the device comprises a membrane holder for mounting the membrane.

In certain embodiments, the device comprises a container holder for holding the container, which partially forms the second chamber. The container holder may be releasably secured to the membrane holder. The container holder and/or the membrane holder and/or the basis may be made from any suitable material preferably a plastic material, such as PTFE, polymethyl(meth)acrylate or polyoxymethylene or a metal, preferably steel.

Preferably, if the container is a glass container, a damping pad may be arranged between the glass container and the container holder for avoiding damaging and sealing the glass container.

In some embodiments the membrane holder comprises clamping means for mounting the membrane, the membrane holder and/or the clamping means being configured to accommodate membranes having various thicknesses. Typically, the clamping means may be adjustable. Examples for clamping means include screws, clamps, bolts, locks, etc.

In some embodiments, the device comprises a base, and preferably the first chamber is partially formed by the base.

In further embodiments the base and/or the membrane holder comprises at least one sealing to seal the membrane against the base and/or against the membrane holder. The sealing ring may be configured such that it circumferentially fully surrounds the periphery of the membrane. The sealing ring may also comprise a gas outlet in fluidic communication with the first chamber and being configured to vent any gas present in the first chamber out of the first chamber.

In some embodiments, the base and/or the membrane holder comprises a spacer ring. Such a spacer ring allows for employing differently thick membranes.

In some embodiments the first chamber comprises a gas outlet, particularly a fluidic switch such as e.g. a valve. The gas outlet and the membrane are arranged such that gas within the first chamber is during supplying the dispersed aqueous phase to the first chamber, in particular during the first/initial filling of the first chamber with the dispersed aqueous phase, directed towards the gas outlet and removed from the first chamber via the gas outlet. In some examples, the membrane is inclined with respect to the central longitudinal axis of the device. Thus, the angle in a cross sectional view along the central longitudinal axis between the central longitudinal axis and the first and/or second side of the membrane is different from 90°. For example, the acute angle between the second side of the membrane and the central longitudinal axis may be between 45° and 89°, preferably between 70° and 88°, more preferably between 78° and 87°. In such embodiments, the gas outlet may be arranged at the top edge of the first chamber, which is formed by the membrane and another chamber wall. This ensure that any residual gas, in particular air, being present in the first chamber, for example prior to using the device, rises to the membrane and due to the inclined arrangement of the membrane is directed to the top edge and thus to the gas outlet. Normally, the channels of the membrane are too narrow for air to pass through and therefore a gas outlet as described in the embodiments above enables to remove all remaining gas, which otherwise can negatively influence uniform droplet size and distribution or block the first fluid from reaching all the micro-channels, hence decreasing the throughput. Typically, the gas outlet may be in fluid communication with the environment of the device.

In some embodiments the device comprises at least one heater to heat the dispersed aqueous phase and/or the continuous oil phase and/or at least one cooler to cool the dispersed aqueous phase and/or the continuous oil phase. It may be beneficial to heat or cool either of the phases, as curing of the generated dispersed droplets may be readily effected by a temperature changes, for example by allowing the emulsion or dispersion to cool. Typically, the at least one heater may provide enough thermal energy to heat the dispersed aqueous phase and/or the continuous oil phase up to 100° C., up to 125° C., or up to 150° C. The heater may for example comprise a heating bath, such as a water bath or an oil bath. Alternatively, the heater may be an IR-radiator, a heating coil, or any other suitable heater.

In further embodiments the device comprises a first reservoir for the dispersed aqueous phase and/or a second reservoir for the continuous oil phase. Both the first and second reservoir may be pressurized. For example, the reservoirs may be fluidic connected to a pressure source, such as a compressor. Alternatively, the reservoirs may be syringes and pressurized by a common syringe pump and/or a plunger or a peristaltic pump, gear pump or any other pumping system.

In some embodiments, a flow restrictor is arranged between the second reservoir for the continuous oil phase and the second chamber. Such a restrictor is beneficial, as the second chamber typically does not provide a significant flow resistance for the continuous oil phase. Thus, by using a flow restrictor, the device is more stable, as unintentional pressure differences, for example by fluctuating air pressure, can be avoided.

In further embodiments, the second inlet comprises a supply channel being at least partially circumferentially arranged around the central longitudinal axis, respectively the axis being perpendicular to the first and second side of the membrane and intersecting the center of the membrane. The supply channel comprises one or more openings into the second chamber. At least partially circumferentially arranged around the above mentioned axis means that the supply channel may have the contour of, a partial circle, such as a semi-circle or a third of a circle, etc. Preferably, the supply channel is fully circumferentially arranged around the central longitudinal axis, respectively the axis being perpendicular to the membrane and intersecting the center of the membrane. In such embodiments, the supply channel forms a ring-like structure. Preferably, the supply channel comprises multiple openings into the second chamber, which in particular are essentially uniformly distributed along the circumference of the supply channel. Typically, the one or more openings of the supply channel may be arranged in the direction of the dispersion outlet, i.e. such that the openings are facing the dispersion outlet. Embodiments comprising a supply channel have the advantage that the continuous oil phase can be uniformly and smoothly introduced into the second chamber without causing detrimental turbulences which negatively influence the uniform shape and size distribution of the generated microdroplets. In some embodiments, the one or more openings of the supply channel are arranged such that a vortex is generated when the continuous oil phase is provided into the second chamber. Particularly, the one or more openings may be tubular and the longitudinal axis of each tubular opening can be inclined with respect to the central longitudinal axis of the device. Typically, all tubular openings are uniformly inclined. The generation of a vortex is beneficial as firstly, a surface stabilizer which may generally be comprised in the first and/or the continuous oil phase may be more evenly distributed, which will thus enhance the stability of the formed emulsion or dispersion and secondly, because the transport of the generated emulsion or dispersion towards the dispersion outlet is accelerated, which is particularly beneficial if the density of the first and continuous oil phase is essentially equal.

Typically, the supply channel is arranged at the bottom of the second chamber, i.e. adjacent to the membrane. The supply channel may for example also be arranged circumferentially around the membrane. The supply channel may have a diameter of 2 mm to 100 mm, preferably 5 mm to 20 mm.

Alternatively, the second inlet may constitute a single inlet opening directly into the second chamber, preferably from a lateral side of the second chamber.

In another aspect, the overall objective is achieved by an assembly of capsules, particularly microcapsules, comprising a plurality of capsules produced according to the method according to any of the embodiments described herein, in particular according to any embodiments of the first aspect of the present disclosure.

Each capsule is typically a solid capsule, in particular a compact capsule. It is understood that the term "capsule" does in some embodiments also include a bead or other suitable particles.

In some embodiments, the capsules of the assembly, in particular all capsules of the assembly, have an equal size distribution with a coefficient of variation of 10% or less, particularly of 8% or less, particularly of 6% or less, particularly of 5% or less, particularly of 4% or less.

The skilled person understands that the coefficient of variation may be calculated by the ratio of the standard deviation σ to the mean μ, i.e. the average capsule size of the capsules of the assembly.

In some embodiments, the assembly of capsules comprises more than 50 capsules, particularly more than 100 capsules, particularly more than 500 capsules, particularly more than 1000 capsules, particularly more than 10 000 capsules, produced according to the method according to any of the embodiments described herein.

In some embodiments, each capsule of the assembly of capsules has a particles size of particle size of less than 4 mm, preferably between 1 μm and <4 mm, more preferably between 1 μm and <1 mm, more preferably between 10 μm and <1 mm.

In some embodiments, the capsules of the assembly, in particular all capsules of the assembly, have a maximum difference of 1% with respect to a perfect sphere. In particular, the surface of the capsules has a maximum difference of 5% or even of maximum 1% with respect to a perfect sphere.

BRIEF DESCRIPTION OF THE DRAWINGS

The terms Fig., Figs., Figure, and Figures are used interchangeably in the specification to refer to the corresponding figures in the drawings.

The herein described invention will be more fully understood from the detailed description given herein below and the accompanying drawings which should not be considered limiting to the invention described in the appended claims. The drawings are showing:

FIGS. 2a and 2b a schematic representation of the method according to another embodiment the present disclosure;

FIG. 12 shows images (FIGS. 12a and b) of an assembly of capsules according to other embodiments of the present disclosure.

DESCRIPTION

Figure 1:
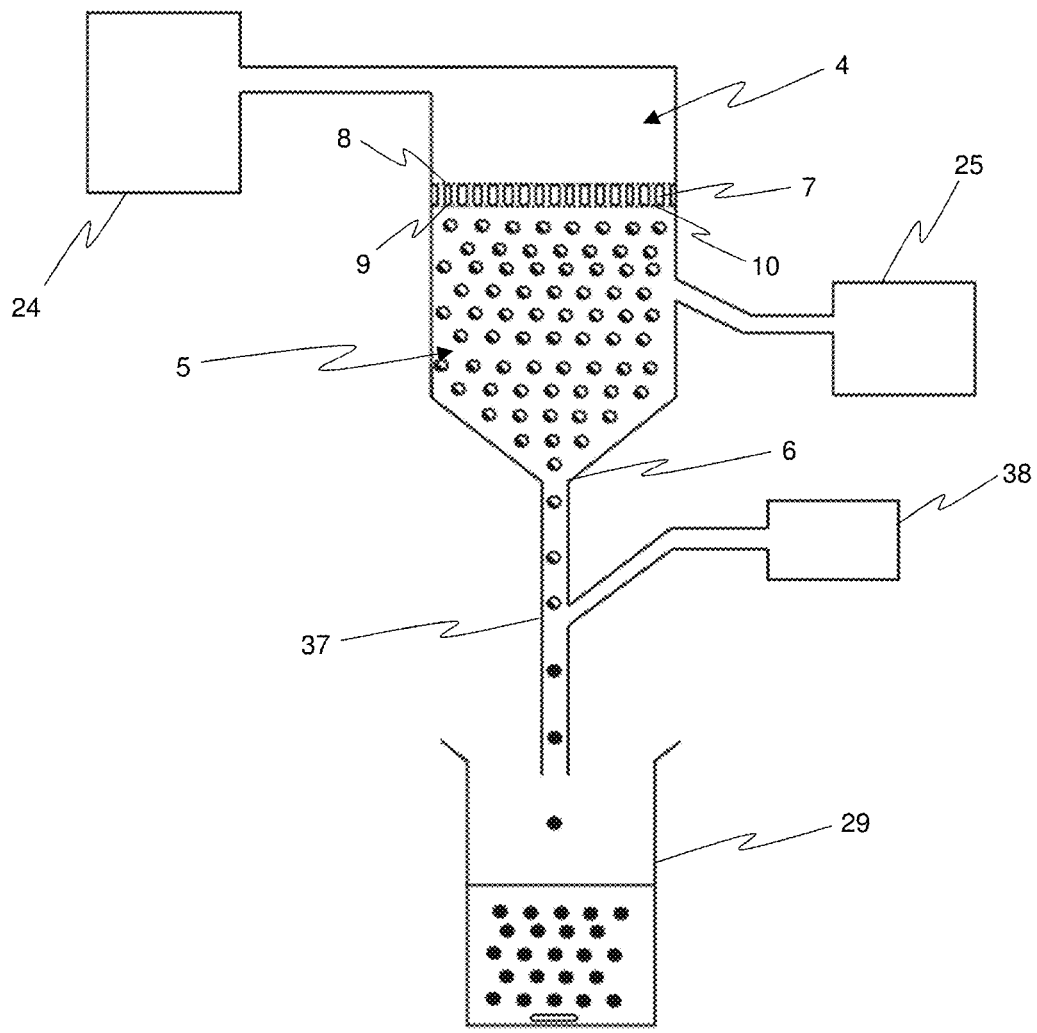
FIG. 1 a schematic representation of the method according to one embodiment of the present disclosure.

FIG. 1 illustrates schematically the method according to an embodiment of the present disclosure. Dispersed aqueous phase is provided in first chamber 4 from first reservoir 24 containing the dispersed aqueous phase and being in fluidic connection with first chamber 4. A continuous oil phase is supplied from second reservoir 25 to the second chamber 5. As can be seen, reservoir 25 is in fluidic communication with second chamber 5. First chamber 4 and second chamber 5 are separated from each other by membrane 7 having a first side 8 facing the first chamber and an opposing second side 9 facing the second chamber 5. Fluidic communication between first chamber 4 and second chamber 5 is established by channels 10 of membrane 7. The dispersed aqueous phase comprising water, a hydrogel matrix-forming agent and a masked gelation-inducer agent, are guided from first chamber 4 through channels 10 of membrane 7 into second chamber 5 containing the continuous oil phase, which comprises oil and at least one first surfactant, upon which microdroplets form, which represent a emulsion or dispersion of the dispersed aqueous phase in the continuous oil phase. This emulsion or dispersion is then continuously removed from second chamber 5 via dispersion outlet 6. Dispersion outlet 6 is directly connected to process line 37 which is configured such that the emulsion or dispersion exits the second chamber in the direction of the gravitational force vector and is arranged such that a straight flow path is provided, at least for a certain defined length. Process line 37 is in fluidic communication with third reservoir 38 for a suitable chemical reagent being configured to liberate a masked gelation-inducer agent, which may be present in the dispersed aqueous phase. The chemical reagent reacts with the masked gelation-inducer agent within process line 37, thereby liberating the gelation-inducer agent, which then induces hydrogel matrix formation and thus produces capsules with a hydrogel matrix. The capsules are then collected in collection vessel 29 being in fluidic communication with process line 37. Matrix formation is completed within collection vessel 29, which in the embodiment shown may be equipped with a stirrer.

FIGS. 2a and 2b show schematically the method according to another embodiment of the present disclosure. It is understood that the reference signs being identical to the ones in FIG. 1 correspond to the same features unless stated otherwise. FIG. 2a shows the generation of dispersed aqueous phase. In this embodiment, the dispersed aqueous phase in step a. is an emulsion of an oil composition 101 in a water phase 102, wherein the emulsion comprises at least one second surfactant. Formation of such an emulsion can be performed by mixer 103. The at least one second surfactant stabilizes the formed emulsion. This emulsion is then provided in FIG. 2b into first reservoir 24, from which it is provided into first chamber 4. The emulsion in first chamber 4 is then guided through channels 10. As the emulsion generally comprises as the major component the water phase 102, a step emulsification takes place as the emulsion reaches the channel outlet opening into second chamber 5, thereby forming a emulsion or dispersion of the dispersed aqueous phase, i.e. monodisperse droplets 103 in the continuous oil phase. It should be noted that the sizes of the droplets are exaggerated for clarity purposes. Furthermore, the relative size of droplets 101 with respect to droplets 103 does not resemble the reality. Each monodisperse droplet 103 in second chamber 5 now comprises one or more droplets 101 being dispersed in water phase 102, as it illustrated in the enlarged view of a droplet. Thus the emulsion or dispersion in second chamber 5 may be considered as a "oil in water in oil emulsion". The formed emulsion or dispersion is removed from second chamber 5 via process line 37. Hydrogel matrix formation may either be effected as in the embodiment of FIG. 1, i.e. by providing a suitable chemical reagent which reacts with a masked gelation-inducer agent being included in the dispersed aqueous phase in FIG. 2a. As in FIG. 1, the suitable chemical reagent may be provided from third reservoir 38. Alternatively, energy source 39 may be provided, which may provide a gelation inducer. For example, energy source 30 may be a UV light source, which exposes the hydrogel matrix-forming agent being present in the dispersed aqueous phase to UV light, thereby inducing hydrogel matrix formation. It is understood that in such embodiments, process line 37 is generally configured to be permeable for the corresponding energy used, i.e. for UV light. Alternatively, energy source 39 may be a heater or a cooler, providing thermal energy in order to induce hydrogel matrix formation. In some embodiments, the suitable chemical reagent may be a photoacid generator and energy source 39 provides the light required to produce the corresponding acid from the photoacid generator. As in the embodiment of FIG. 1, the formed capsules with a hydrogel matrix are collected in collection vessel 29.

Figure 3:
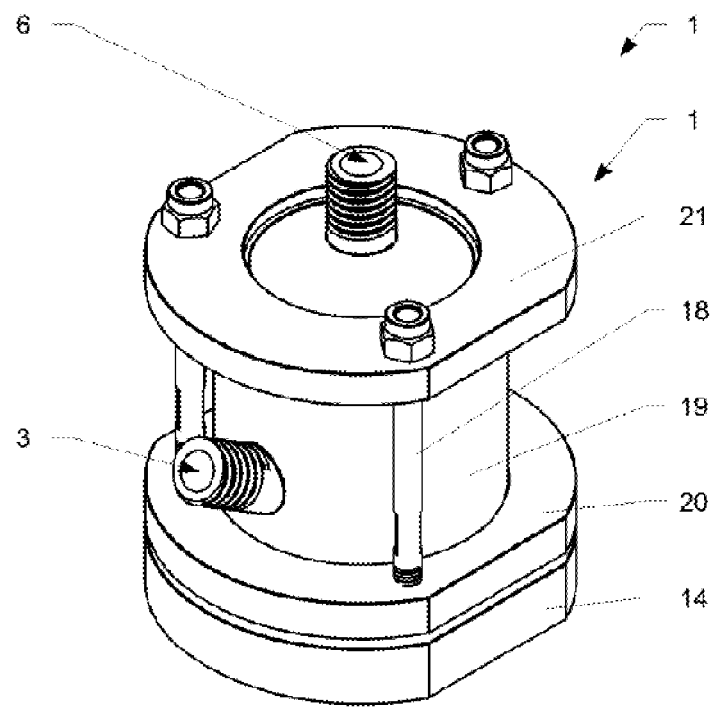
FIG. 3 view of a device for generating a emulsion or dispersion of a dispersed aqueous phase in a continuous phase according to a first embodiment of the present disclosure.

FIG. 3 depicts device 1 which can be used in a method according to the present disclosure, particularly for generating capsules with a hydrogel matrix. Device 1 comprises a container 19, which is made from glass and base 14 being made from metal. Base 14 comprises a first inlet (not shown, see FIGS. 2a and 2b) for supplying a dispersed aqueous phase, opening into a first chamber. The first chamber may be partly formed by base 14 and membrane 7 (see FIG. 3). Container 19 comprises second inlet 3 for supplying a continuous oil phase, opening into a second chamber and dispersion outlet 6 for collecting the emulsion or dispersion generated within the second chamber. The second chamber is being formed by container 19 and membrane 7 (see FIG. 3). Device 1 further comprises membrane holding structure 20 being fixedly connected to base 14. Furthermore, the device contains container holding structure 21, which is fixedly connected via clamping means 18 to membrane holding structure 20. As a result, container 19 is fixedly connected to base 14.

Figure 4:
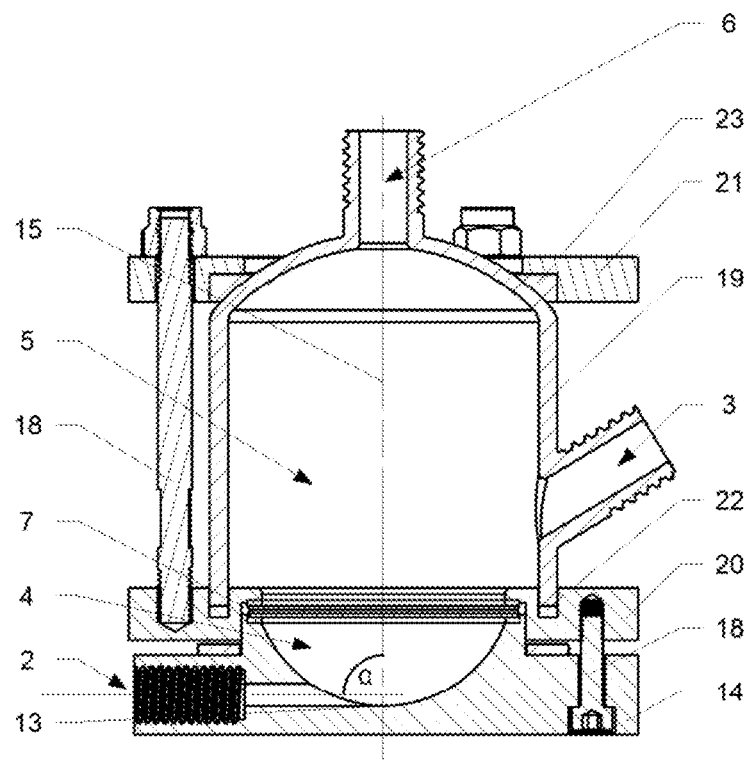
FIG. 4 a cross-sectional view of the device shown in FIG. 3.

FIG. 4 shows a cross-sectional view of device 1 of FIG. 3. Device 1 comprises base 14 with first inlet 2 for supplying the dispersed aqueous phase. Inlet 2 opens into first chamber 4, which is partially formed by base 14. Device 1 further contains container 19 with second inlet 3 for supplying the continuous oil phase and dispersion outlet 6 for collecting the emulsion or dispersion of the dispersed aqueous phase in the continuous oil phase. Second inlet 3 opens into second chamber 5, which is partially formed by container 19. The first chamber and the second chamber are being separated by membrane 7. As can be readily seen from FIG. 4, the first chamber has a rounded cross-section with respect to the corresponding cross-sectional plane along the central longitudinal axis 15 and being perpendicular to membrane 7. In the particular embodiment shown, first chamber 4 has a semi-circular cross-section and may thus have the shape of a hemisphere. First inlet 2 is arranged in the region of pole 13 of the hemisphere. Second chamber 5 is tapered towards dispersion outlet 6, which is arranged on longitudinal axis 15 extending along the longitudinal direction of the device, intersecting the center of the first and second chamber, being perpendicular to membrane 7 and intersecting the center of the membrane. As can be seen, longitudinal axis 15 constitutes a central axis of the device in the longitudinal direction. In the embodiment shown, the second chamber is arch-shaped towards dispersion outlet 6. Thus, second chamber 6 has a U-shaped cross-section. First inlet 2 is arranged in an angle α of essentially 90° with respect to central axis 15 and the channels of the membrane, which are in general parallel to axis 15. Device 1 comprises membrane holder 20 and container holder 21, which are fixedly connected with each other via releasable clamping means 18. Membrane 7 is mounted to membrane holder 20 by clamping the membrane between membrane holder 7 and base 14. Membrane holder 20 is fixedly connected to base 14 via clamping means 18. For safely securing glass container 19 between membrane holder 20 and container holder 21, pad 23, which in the particular case is a foam pad, can be arranged between container 19 and container holder 21. Membrane holder 20 comprises groove 22, for receiving container 19.

Figure 5:
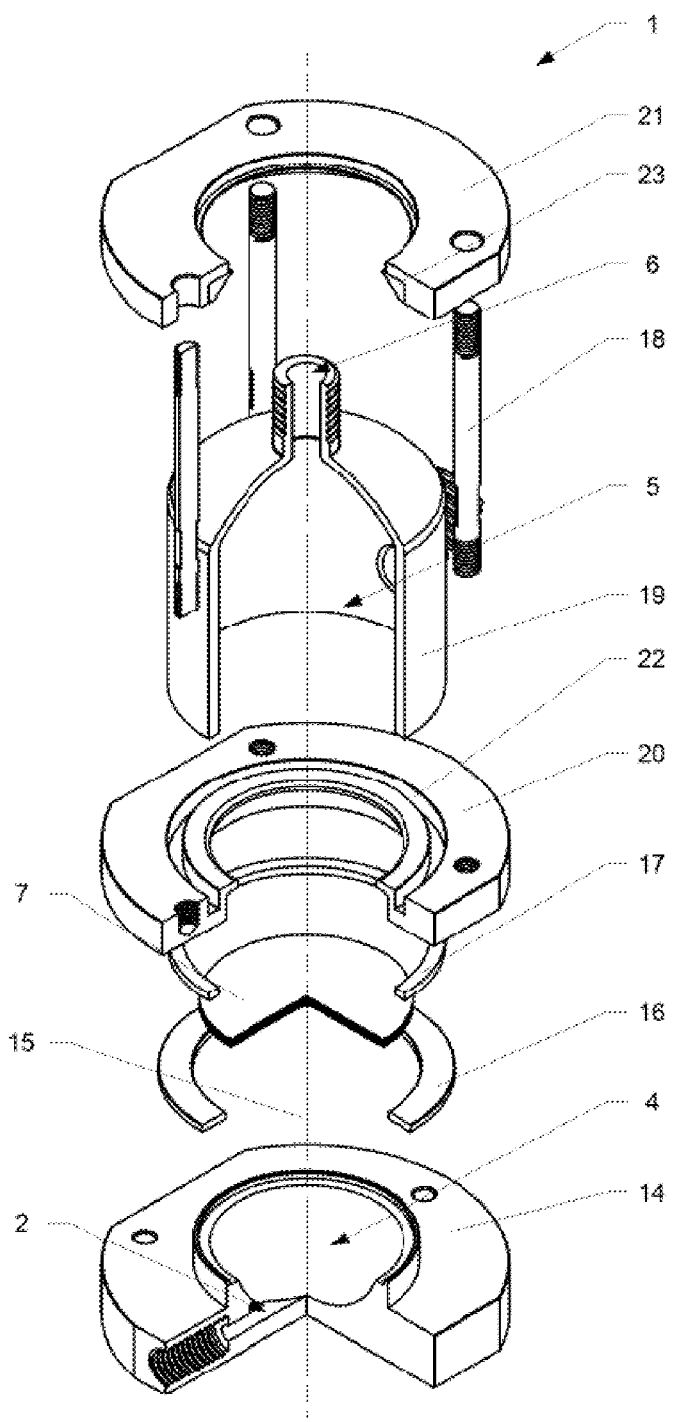
FIG. 5 an exploded partially cut-out view of the device shown in FIG. 3.

FIG. 5 shows an exploded view of partially cut device 1 of FIGS. 2a and 2b. As can be seen, the first chamber is partially formed by base 14 and has the shape of a hemisphere. First inlet 2, which is arranged in an angle of essentially 90° to central axis 15, is arranged on the pole of the hemisphere. Base 14 comprises spacer ring 16 which enables the use of different membranes with different thicknesses and membrane holder 20 comprises sealing ring 17. Membrane 7 is arranged between rings 16 and 17. The design of device 1 with adjustable clamping means 18 allows to employ membranes of various thicknesses. Membrane holder 20 further comprises circumferential groove 22 for receiving the lower end portion of container 19. Clamping means 18 fixedly and releasably connect membrane holder 20 with container holder 21.

Figure 6:
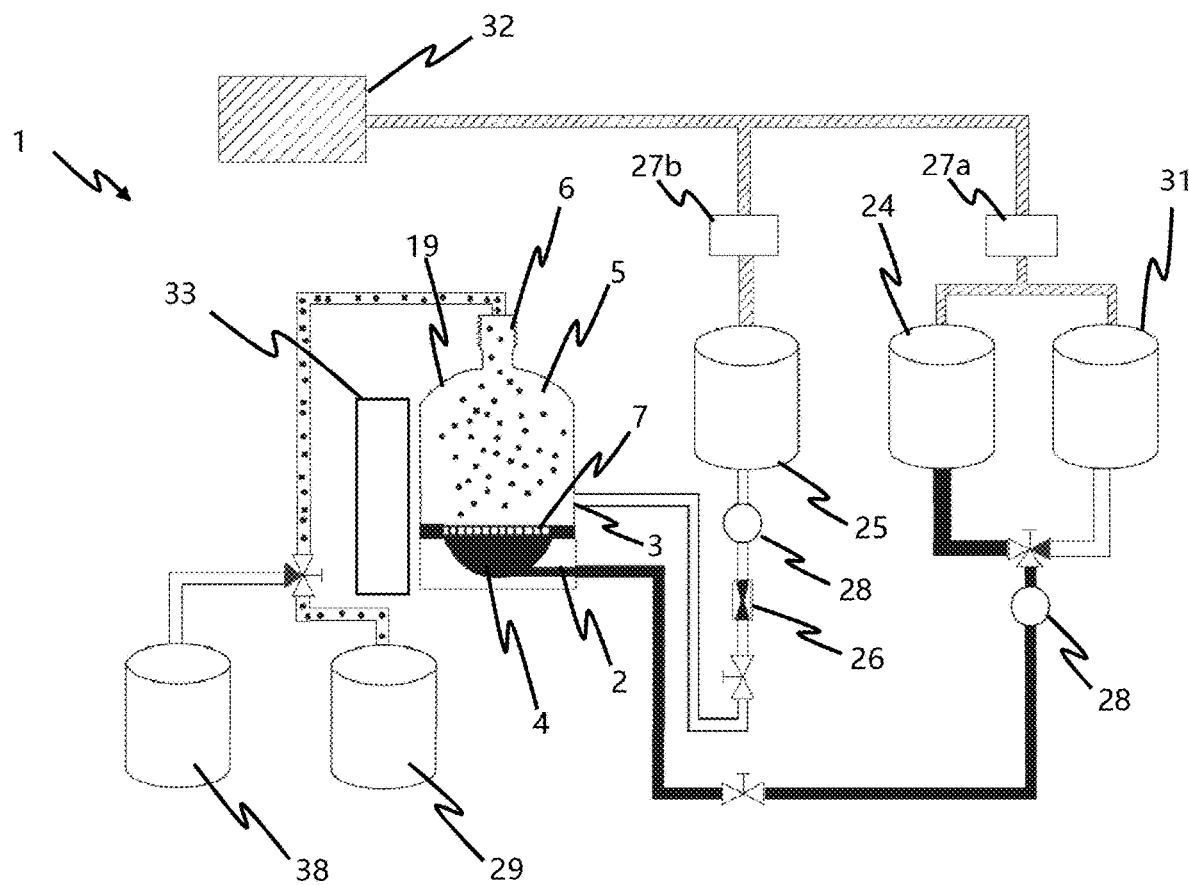
FIG. 6 a schematic view of a device 1 according to another embodiment of the present disclosure.

FIG. 6 shows a schematic view of a device 1 which may be used according to a preferred embodiment of the present disclosure. Second chamber 5 is formed by container 19 and membrane 7 which separates first chamber 4 from second chamber 5. Container 19 comprises dispersion outlet 6, which is in fluid connection with collection vessel 29. In general, the fluid flow may be controlled by a valve, such as a three-way valve. Device 1 further comprises first reservoir 24 which is in fluid communication with first chamber 4 which may either only server as a reservoir for providing the dispersed aqueous phase into first chamber 4 via first inlet 2 or which can also serve as the mixing vessel for preparing the dispersed aqueous phase. Arranged between first reservoir 24 and first inlet 2 is a flow meter 28 for measuring the fluid flow of the dispersed aqueous phase. First reservoir 24 is in fluid connection with pressure source 32. Furthermore, pressure regulator 27a is arranged between first reservoir 24 and pressure source 32. In addition to first reservoir 24, device 1 comprises rinsing reservoir 31 which is also in fluid communication with both first chamber 4 and pressure source 32. Rinsing reservoir 31 is configured for providing a rinsing solution into first chamber 4 for cleaning device 1 after its intended use. Device 1 further comprises heater 33 configured for heating the first and second chamber during the production of a dispersed phase. Furthermore, second chamber 5 is in fluid communication with second reservoir 25 for supplying second chamber 5 with the continuous oil phase. Flow restrictor 26 and flow meter 28 are arranged between second chamber 5 and second reservoir 25. In the embodiment shown, flow restrictor 26 is arranged behind flow meter 28 in the direction of flow. Second reservoir 25 is further in fluidic connection with pressure source 32. Additionally, a second pressure regulator 27b is arranged between second reservoir 25 and pressure regulator 27a. The device further comprises third reservoir 38 for a suitable chemical reagent being configured to liberate a masked gelation-inducer agent, which may be present in the dispersed aqueous phase.

Figure 7:
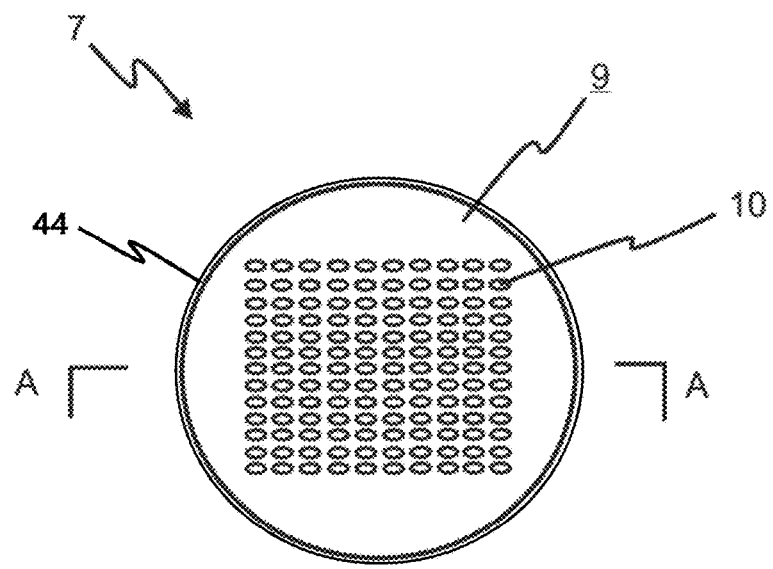
FIG. 7 a schematic enlarged view of a second side of a membrane according to an embodiment of the present disclosure.

FIG. 7 shows a monolayer membrane 7 for generating a emulsion or dispersion of the dispersed aqueous phase in the continuous oil phase, which can be used in a method and/or a device as described in any of the embodiments disclosed herein. Membrane 7 has a first side 8 (not shown) and second side 9, which in an operative state faces a second chamber. Multiple micro-channels 10 extend through membrane 7. Each channel 10 has an elliptical contour. In addition, membrane 7 comprises membrane sealing ring 44, which circumferentially fully surrounds the periphery of the membrane.

Figure 8:
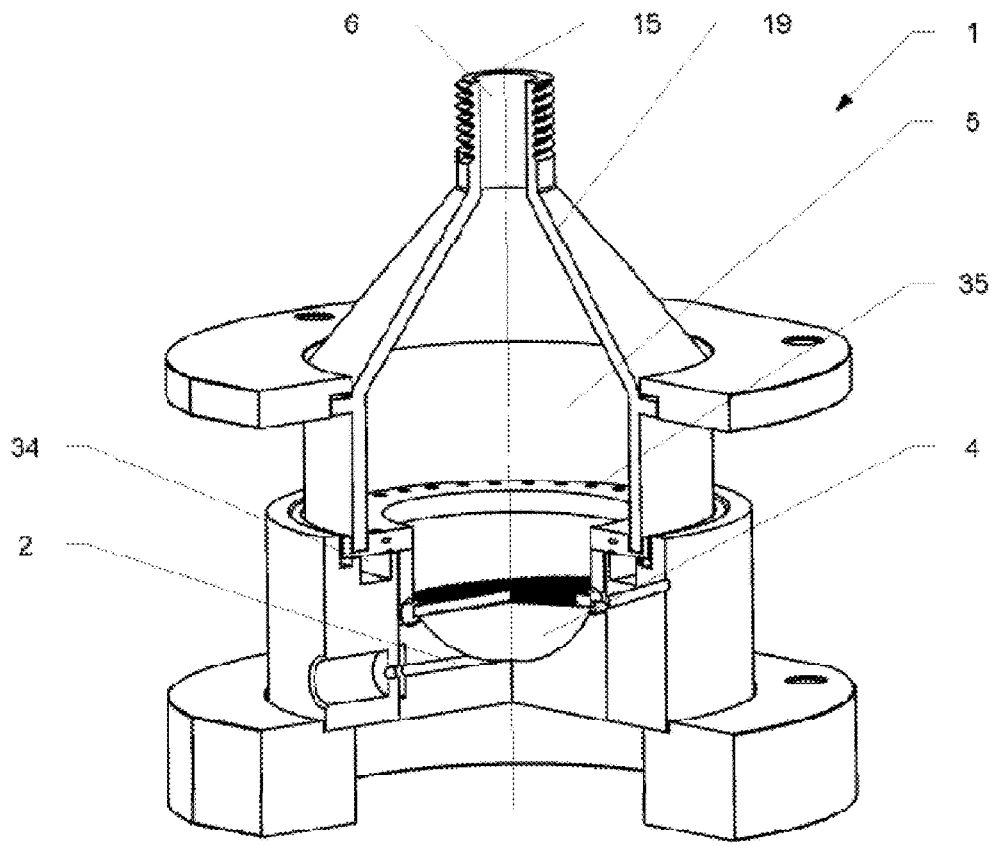
FIG. 8 a partial cross-sectional of a device according to another embodiment of the present disclosure.

FIG. 8 shows a partial cross-sectional view of a device which can be used in embodiment of the present disclosure. The device 1 has a first inlet 2 for supplying a dispersed aqueous phase, which opens into first chamber 4 having a rounded cross-section. In the embodiment shown, first chamber 4 has the shape of a spherical dome with a radius at the base of the dome being smaller than the radius of the corresponding hypothetical full sphere. Second chamber 5 is at least partially defined by container 19. The device further comprises dispersion outlet 6 for collecting the generated emulsion or dispersion of the dispersed aqueous phase in the continuous oil phase. The corresponding membrane is not shown for better visualization. The second inlet opening towards the second chamber 5 comprises in the depicted embodiment a supply channel 34 being circumferentially arranged around central longitudinal axis 15 and/or the axis being perpendicular to the first and second side of the membrane and intersecting the center of the membrane. The supply channel 34 comprises a plurality of openings 35 into second chamber 5. Openings 35 are uniformly distributed along the circumference of the supply channel and are arranged in the direction of dispersion outlet 7. In the embodiment shown, supply channel 34 forms a ring-like structure, being arranged at the bottom of second chamber 5, i.e. at the edge of the membrane and container 19. In the embodiment shown, the supply channel has an angular cross-section. Alternatively, the supply channel may have a rounded, particularly a circular cross-section.

Figure 9:
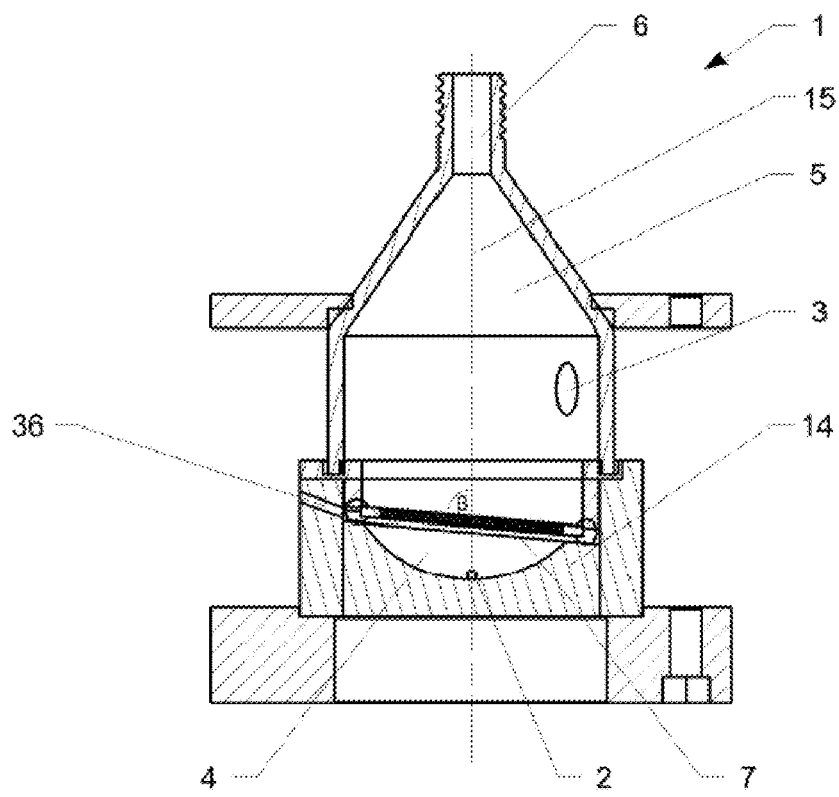
FIG. 9 a cross-sectional of a device according to another embodiment of the present disclosure.

FIG. 9 shows a cross-sectional view of another embodiment of the device shown in FIG. 8. The device 1 has a first inlet 2 for supplying a dispersed aqueous phase, which opens into first chamber 4 having a rounded cross-section. In the embodiment shown, first chamber 4 has the shape of a spherical dome. A membrane 7 separates first chamber 4 from second chamber 5. In contrast to the embodiment shown in FIG. 2, the membrane is inclined with respect to the central longitudinal axis 15 of the device 1. The acute angle β in a cross sectional view along the central longitudinal axis between the central longitudinal axis and the second side of the membrane is between 45° and 89°, preferably between 70° and 88°, more preferably between 78° and 87°. The device 1 comprises additionally gas outlet 36. The gas outlet and the membrane are arranged such that gas within the first chamber is during supplying the dispersed aqueous phase to the first chamber, in particular during the first filling, directed towards the gas outlet and removed from first chamber 4 via the gas outlet 36. As can be seen, gas outlet 36 is arranged at the top edge of first chamber 4, which is formed by the membrane 7 and the chamber wall, which is part of the base 14. Before the initial filling of first chamber 4 with the dispersed aqueous phase, gas, particularly air, is present in the first chamber. Upon filling of first chamber 4 with the dispersed aqueous phase, air is pushed out of gas outlet 36. Due to the arrangement of membrane 7 and gas outlet 36, essentially all gas can be removed from first chamber 4. As remaining gas, in particular gas bubbles have detrimental effects on pressure distribution, size and particle distribution becomes more uniform.

Figure 10:
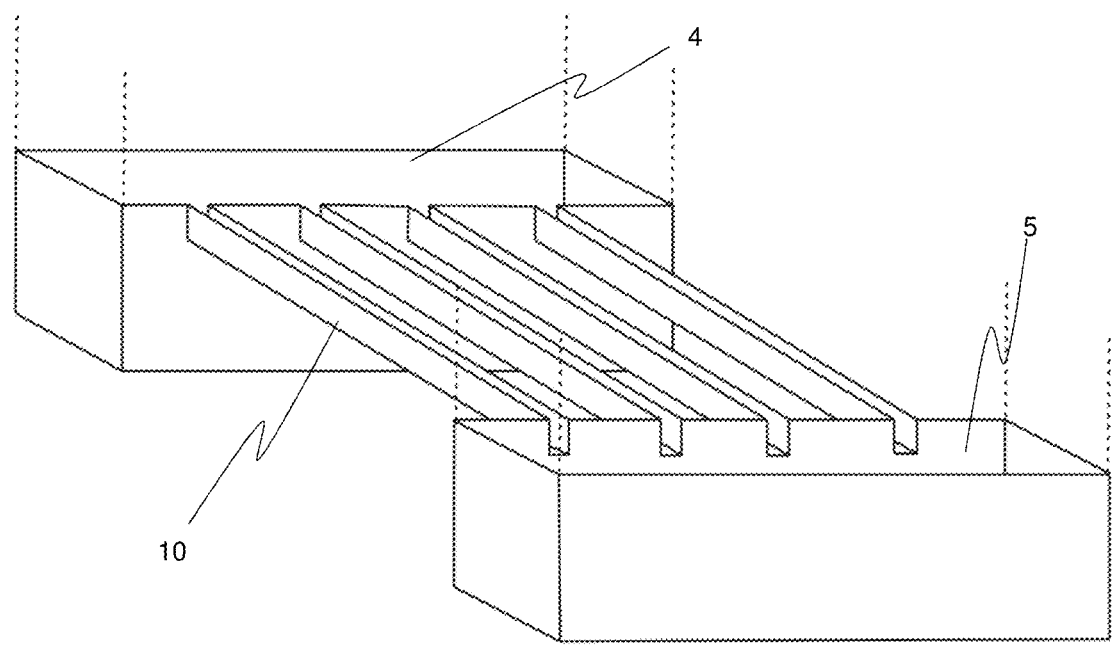
FIG. 10 shows another device which can be used in the method according to an embodiment of the present disclosure.

FIG. 10 shows a sectional view of another device which can be used in the method according to the present disclosure (cf. FIG. 1). The device comprises first chamber 4 being in fluidic connection via micro-channels 10 with second chamber 5. Thus, the in the first chamber can be provided a dispersed aqueous phase as described above, which is then guided via micro-channels 10 from the first chamber into the second chamber 5, which contains a continuous oil phase, the continuous oil phase comprising oil and at least one first surfactant.

Figure 11:
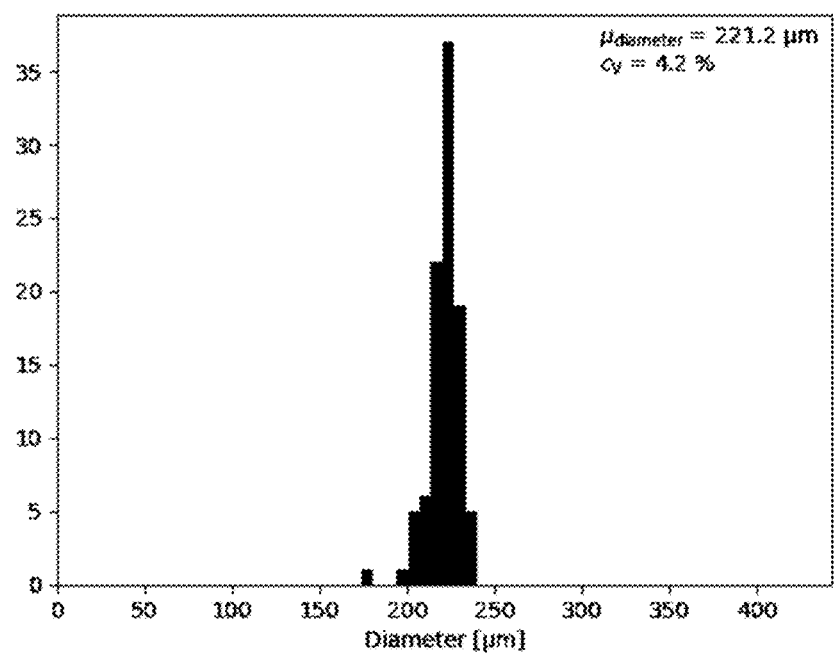
FIG. 11 shows the particle size distribution of an assembly of capsules according to an embodiment of the present disclosure comprising a plurality of capsules.

FIG. 11 shows the size distribution of an assembly of alginate capsules according to an embodiment of the present disclosure. As can be seen, the average particle size of 221.2 µm with a coefficient of variation regarding the size distribution of 4.2%.

FIGS. 12a and b shows images of an assembly of capsules according to other embodiments of the present disclosure. As can be seen, all capsules have essentially the shape of a perfect sphere.

The following tables illustrate suitable recipes which can be used in the method according to the present disclosure. It is however understood that these examples serve as illustrative embodiments but are not to be understood as limiting examples.

TABLE 1

Generation of an dispersed aqueous phase A

| Component | Amount |
| --- | --- |
| Sodium Alginate | 0.1-2 wt % |
| CaNa$_2$EDTA | 2-120 mM |
| Water | Added to 100 wt % |

TABLE 2

Generation of an dispersed aqueous phase B

| Component | Amount |
| --- | --- |
| Sodium Alginate | 0.18-2 wt % |
| CaNa$_2$EDTA | 3-80 mM |
| Polyvinylalcohol | 0.2-3 wt % |
| Sunflower oil | 3-40 wt % |
| Water | Added to 100 wt % |

TABLE 3

Generation of an dispersed aqueous phase C

| Component | Amount |
| --- | --- |
| Agar | 0.18-5 wt % |
| Water | Added to 100 wt % |

TABLE 4

Generation of a continuous oil phase

| Component | Amount |
| --- | --- |
| PGPR (Polyglycerol polyricinoleate) | 1.5-3 wt % |
| Span 80 | 0.1-2 wt % |
| MCT (medium-chain triglycerides) | Added to 100 wt % |

Although the disclosed subject matter has been described in detail for the purpose of illustration based on what is currently considered to be the most practical and preferred embodiments, it is to be understood that such detail is solely for that purpose and that the disclosed subject matter is not limited to the disclosed embodiments, but, on the contrary, is intended to cover modifications and equivalent arrangements that are within the spirit and scope of the appended claims. For example, it is to be understood that the presently disclosed subject matter contemplates that, to the extent possible, one or more features of any embodiment can be combined with one or more features of any other embodiment.

The invention claimed is:

1. A method for generating capsules with a hydrogel matrix, the method comprising the steps:
   a. providing in a first chamber a dispersed aqueous phase, the dispersed aqueous phase comprising water and a hydrogel matrix-forming agent, wherein the hydrogel matrix-forming agent is configured to form a hydrogel matrix upon exposure to a gelation inducer;
   b. providing in a second chamber a continuous oil phase, the continuous oil phase comprising oil and at least one first surfactant;
      wherein the first chamber and the second chamber are fluidically connected by multiple channels; and
      wherein the method further comprises:
   c. guiding the dispersed aqueous phase from the first chamber through the multiple channels into the second chamber to form an emulsion or a dispersion of the dispersed aqueous phase in the continuous oil phase; and
   d. exposing the hydrogel matrix-forming agent to the gelation inducer to form capsules with a hydrogel matrix,
   wherein the dispersed aqueous phase of step a. further comprises a masked gelation-inducer agent, wherein the masked gelation-inducer agent and the hydrogel matrix-forming agent are configured such that they do essentially not react with each other to form a hydrogel matrix and wherein step d. comprises liberation of the gelation inducer from the masked gelation-inducer agent.

2. The method according to claim 1, wherein the dispersed aqueous phase in step a. further comprises at least one first compound of interest.

3. The method according to claim 1, wherein the dispersed aqueous phase in step a. is an emulsion of an oil composition in a water phase, wherein the emulsion comprises at least one second surfactant.

4. The method according to claim 3, wherein the oil composition comprises at least one second compound of interest.

5. The method according to claim 1, wherein the masked gelation inducer agent contains an alkali metal ion or an alkaline earth metal ion.

6. The method according to claim 1, wherein liberation of the gelation inducer from the masked gelation-inducer agent comprises reacting the masked gelation-inducer agent with a suitable chemical reagent to form the gelation inducer.

7. The method according to claim 1, wherein the gelation inducer is light.

8. The method according to claim 1, wherein prior to step d. the emulsion or dispersion formed in step c. is removed from the second chamber.

9. The method according to claim 1, wherein step d. is at least partially performed under continuous flow of the emulsion or dispersion formed in step c.

10. The method according to claim 9, wherein the emulsion or dispersion formed in step c. flows in a process line during step d.

11. The method according to claim 1, wherein the hydrogel matrix-forming agent is a polysaccharide or a salt thereof.

12. The method according to claim 1, wherein a pressure of 1.01 bar to 2.0 bar is applied to the first chamber and/or wherein a pressure of 1.02 bar to 1.2 bar is applied to the second chamber.

13. The method according to claim 12, wherein the pressure applied to the first chamber is smaller than the pressure applied to the second chamber.

14. The method according to claim 1, wherein step d. is performed for 1 min to 30 min.

15. The method according to claim 1, wherein after step d. the capsules are coated with an additional layer, or with two or more additional layers.

16. The method according to claim 1, wherein after step d. the formed capsules are isolated, dried, cured and/or preserved.

17. The method according to claim 1, wherein the plurality of channels are micro-channels.

* * * * *